United States Patent
Harb et al.

(10) Patent No.: US 12,348,804 B2
(45) Date of Patent: Jul. 1, 2025

(54) USER COLD START MEDIA RECOMMENDATION GENERATION AND EXTERNAL PROVIDER CONTENT PLAY

(71) Applicant: Adeia Guides Inc., San Jose, CA (US)

(72) Inventors: Reda Harb, Issaquah, WA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/104,250

(22) Filed: Jan. 31, 2023

(65) Prior Publication Data

US 2024/0259621 A1    Aug. 1, 2024

(51) Int. Cl.
*H04N 21/25* (2011.01)
*H04N 21/24* (2011.01)
*H04N 21/254* (2011.01)
*H04N 21/258* (2011.01)
*H04N 21/466* (2011.01)

(52) U.S. Cl.
CPC ... *H04N 21/25875* (2013.01); *H04N 21/2407* (2013.01); *H04N 21/2541* (2013.01); *H04N 21/25816* (2013.01); *H04N 21/25883* (2013.01); *H04N 21/4668* (2013.01)

(58) Field of Classification Search
CPC ......... H04N 21/25875; H04N 21/2407; H04N 21/2541; H04N 21/25816; H04N 21/25883; H04N 21/4668
See application file for complete search history.

(56) References Cited

U.S. PATENT DOCUMENTS

| | | | |
|---|---|---|---|
| 8,925,017 B1* | 12/2014 | Howard, Jr. | H04N 21/4828 725/51 |
| 9,641,880 B1* | 5/2017 | Scurtu | H04N 21/4384 |
| 9,774,913 B1* | 9/2017 | Thomas | G06F 16/44 |
| 10,368,133 B1* | 7/2019 | Denk, Jr. | H04N 21/4826 |
| 11,765,431 B2* | 9/2023 | Andries | H04N 21/4312 725/46 |
| 12,126,851 B2 | 10/2024 | Harb et al. | |
| 2004/0210924 A1* | 10/2004 | Duffield | H04N 21/25435 348/E7.063 |

(Continued)

OTHER PUBLICATIONS

U.S. Appl. No. 18/104,246, filed Jan. 31, 2023, Reda Harb.

(Continued)

*Primary Examiner* — Timothy R Newlin
(74) *Attorney, Agent, or Firm* — Haley Guiliano LLP

(57) ABSTRACT

Media content recommendations and user profile display recommendations, including user names and icons of users associated with the subscription, may be provided, for example, upon cold start of a user subscription. A content provider may request a history of user interactions and profile information from a second content provider and then determine that the content items were not previously consumed by this user, and transmit content recommendations accordingly. Generating for play content items not available from a first content provider but available from a second content provider is also contemplated. The content item may be transmitted to the user device via an application associated with the first content provider on the user device, or via an application associated with the second content provider on the user device.

20 Claims, 15 Drawing Sheets

(56) References Cited

U.S. PATENT DOCUMENTS

| | | | |
|---|---|---|---|
| 2004/0243604 A1 | 12/2004 | Gross | |
| 2006/0031899 A1* | 2/2006 | Rabin | G06Q 20/12 348/E7.071 |
| 2006/0282851 A1* | 12/2006 | Errico | G06Q 10/10 348/E7.071 |
| 2008/0162712 A1* | 7/2008 | Fu | H04N 21/2541 709/231 |
| 2009/0187944 A1 | 7/2009 | White et al. | |
| 2011/0058675 A1* | 3/2011 | Brueck | H04L 9/083 709/229 |
| 2011/0311206 A1* | 12/2011 | Hubner | H04N 5/765 386/297 |
| 2012/0008786 A1* | 1/2012 | Cronk | G06F 21/10 726/28 |
| 2013/0185382 A1 | 7/2013 | Hardy | |
| 2013/0283033 A1* | 10/2013 | Ahuja | H04N 21/25875 713/150 |
| 2013/0332839 A1* | 12/2013 | Frazier | H04N 21/4756 715/738 |
| 2014/0344848 A1* | 11/2014 | Busse | H04N 21/462 725/28 |
| 2015/0052547 A1* | 2/2015 | Ansley | H04N 21/42623 725/31 |
| 2015/0169705 A1 | 6/2015 | Korbecki et al. | |
| 2017/0019696 A1* | 1/2017 | Hundemer | H04N 21/2665 |
| 2017/0041670 A1* | 2/2017 | Gopalan | H04N 21/4302 |
| 2017/0094332 A1* | 3/2017 | Thomas | H04N 21/4826 |
| 2017/0094361 A1* | 3/2017 | Thomas | G06F 16/252 |
| 2017/0214953 A1* | 7/2017 | Mares | H04N 21/2393 |
| 2017/0230435 A1 | 8/2017 | Lottermann et al. | |
| 2017/0257654 A1 | 9/2017 | Branch et al. | |
| 2017/0280196 A1* | 9/2017 | Thomas | H04N 21/4826 |
| 2018/0113579 A1* | 4/2018 | Johnston | H04N 21/47217 |
| 2018/0176644 A1* | 6/2018 | Lopez | H04N 21/42203 |
| 2018/0234715 A1 | 8/2018 | Aggarwal et al. | |
| 2018/0332331 A1* | 11/2018 | Dauvin | H04N 21/237 |
| 2018/0352288 A1* | 12/2018 | Chung | H04L 65/612 |
| 2019/0090004 A1* | 3/2019 | Binder | H04N 21/482 |
| 2019/0236093 A1* | 8/2019 | Andavarapu | G06F 16/432 |
| 2019/0320216 A1 | 10/2019 | Liu et al. | |
| 2019/0356962 A1 | 11/2019 | Thomas et al. | |
| 2020/0374586 A1* | 11/2020 | Kumar | H04N 21/4333 |
| 2021/0092492 A1 | 3/2021 | Klappert et al. | |
| 2021/0173864 A1* | 6/2021 | Aravamudan | G06F 16/24578 |
| 2021/0352360 A1* | 11/2021 | Panchaksharaiah | H04N 21/442 |
| 2022/0014915 A1* | 1/2022 | Chauhan | H04N 21/25841 |
| 2023/0064341 A1* | 3/2023 | Ergen | H04N 21/23424 |
| 2023/0403424 A1* | 12/2023 | Bates | H04N 21/4122 |

OTHER PUBLICATIONS

U.S. Appl. No. 18/104,247, filed Jan. 31, 2023, Reda Harb.
"Movies Anywhere", Wikipedia, [retrieved on Apr. 20, 2023 from URL: https://en.wikipedia.org/wiki/Movies_Anywhere) (4 pages).
"UltraViolet(website)," Wikipedia, [retrieved on Apr. 20, 2023 from URL: https://en.wikipedia.org/wiki/UltraViolet_(website)) (9 pages).

* cited by examiner

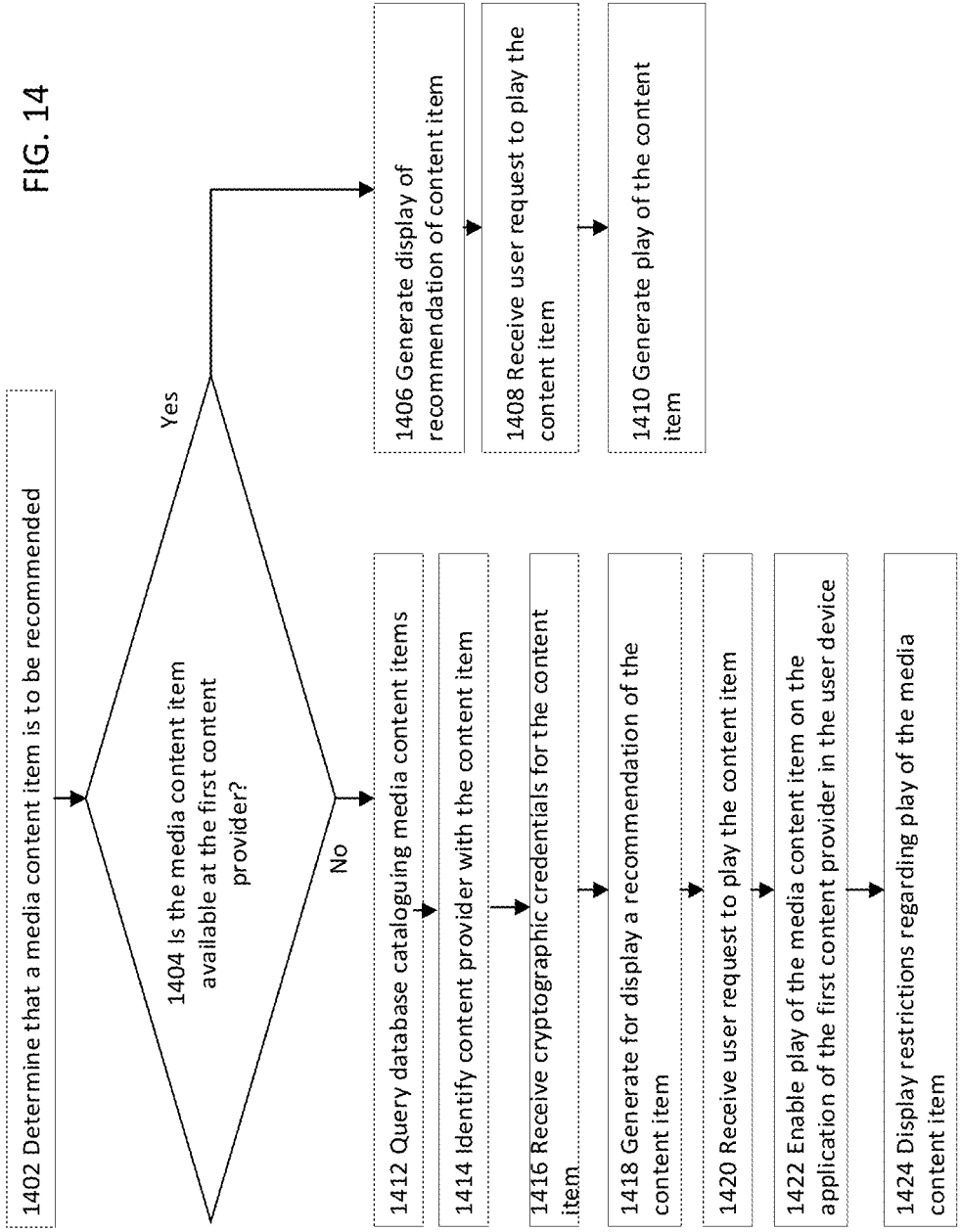

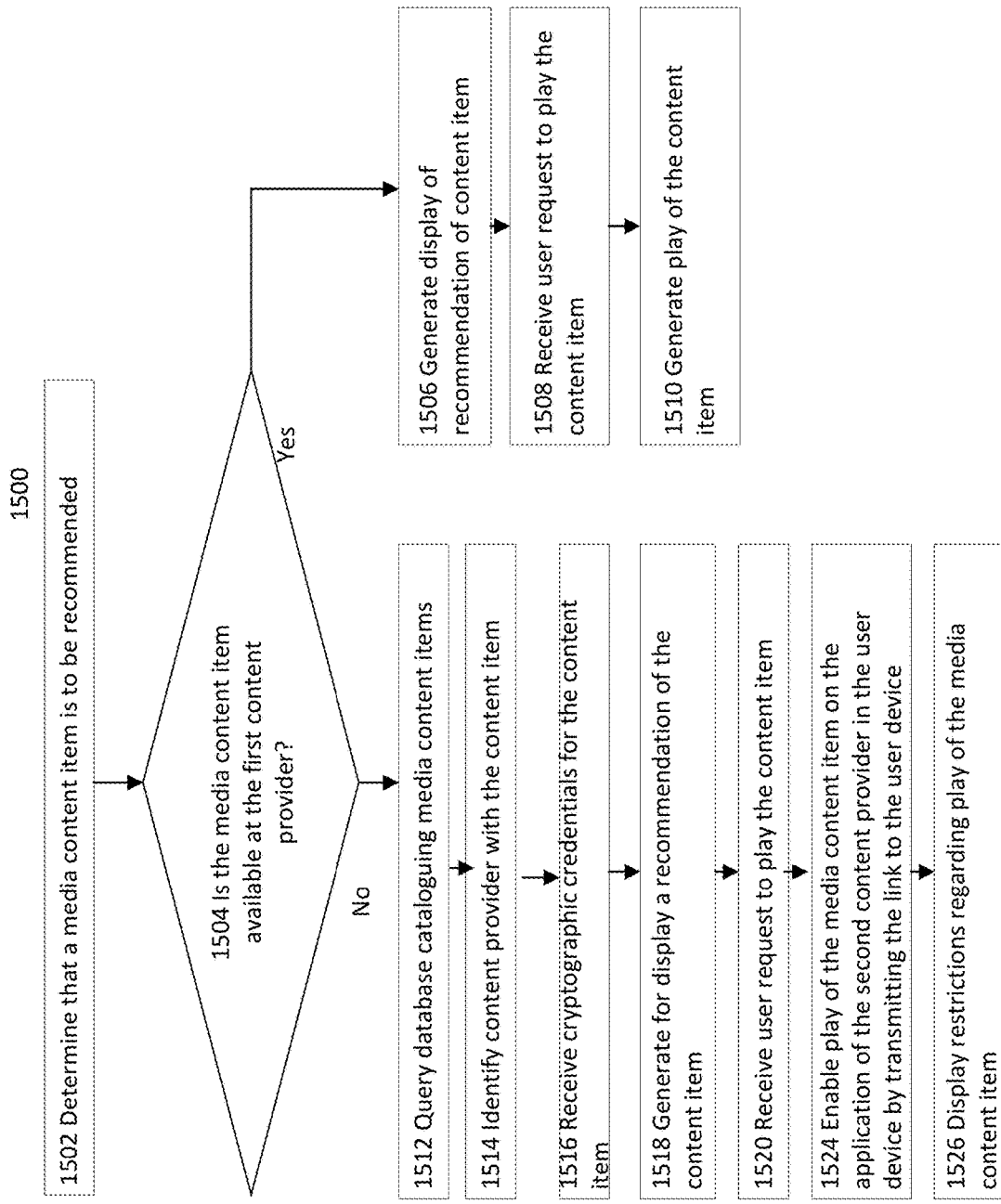

USER COLD START MEDIA RECOMMENDATION GENERATION AND EXTERNAL PROVIDER CONTENT PLAY

BACKGROUND

The amount of content available to users in an online content delivery system can be substantial. Consequently, users need technological assistance through an interface that allows users to identify content that they may desire. To find content, users often rely on content service providers to generate recommendations for them based on media consumption patterns, tracked viewing habits of the user, the user's rating of similar content, user demographic information, and the like.

A content provider's server system may prompt a user to provide user profile information or may automatically compile user profile information. The content provider's server system may, for example, monitor the content the user accesses and/or other interactions the user may have with the content provider. Additionally, the content provider may obtain all or part of other data related to a particular user (e.g., from other web sites on the Internet the user accesses, from other media guidance applications the user accesses, from other interactive applications the user accesses, from another user equipment device of the user, etc.), and/or obtain information about the user from other sources that the user's equipment may access. As a result, a user can be provided with recommendations tailored to the user.

A technological problem that arises in a media streaming and online/cable content context is sometimes referred to as the problem of user cold start. When a new subscription is added by a content service provider, little may be known about the types of content in which the user may be interested, or about the number and demographics of the users associated with that subscription. For example, a media content service provider may be unaware of the people in the household who share the subscription and their viewing habits and preferences. This cold start problem makes personalized content recommendations difficult. At the same time, a content recommendation engine that has information regarding a user's preferences may not know what content the user has already consumed. This inability to provide personalized and accurate content recommendations could lead to user frustration with this type of technology as the service provider's recommendation engine seemingly fails to "understand" the users' needs and preferences. A related technological problem is that such content recommendation engines typically function in isolation, working independently to gather pieces of information about a user. This design imposes an inherent technological limit on the degree to which the recommendation engine is able to "know" its audience and reduces the effectiveness of online content providing technology.

A lack of knowledge upon cold start may also result in a user having to program the content provider interface to reflect information about the people associated with the subscription and their preferences. User profiles, including names of users in the household, their preferred user icons, and their consumption preferences, content genres and specific media content items they like, parental controls on user's content consumption, etc. may need to be programmed for each member of the household who consumes content of the content provider.

Another technological problem arises when a recommendation engine of a content service provider finds relevant content to recommend to a user, but the relevant content is unavailable from the content library or is unavailable according to the content schedule or broadcast schedule of the service provider. This mismatch between the functioning of the recommendation engine and the available content library or content schedule of the content provider may result in user frustration with the online content experience and failure to transmit useful and timely content that may be of use to the user.

SUMMARY

In some embodiments, a content recommendation engine of a content service provider's server system, upon detecting a new user subscription, obtains a history of the user's interactions with a second media content provider. For example, the content service provider's system may automatically query one or more partner service providers as to whether this user is currently, or was previously, a subscriber with them, and if so, request from the partner provider (sometimes referred to herein as "second" media content provider) a user profile containing a history of user interactions with the content provider. Or, two or more content service providers may maintain a shared user registry containing user names or other identifying information, and user profiles, such that upon receipt of a new subscription, the content provider contacts the shared user registry to obtain the history of user interactions. In the alternative, the shared user registry may contain just user identifying information and data noting with which content provider the user has had a subscription, so that the new content provider can seek the user information from the previous content provider(s) that belong(s) to the registry. Or, one or more content service providers may allow each other to search each others' user history information when a new subscriber is enrolled in any of them to retrieve a user profile/history of user interactions for the new subscription.

The content provider with the new subscription may store the history of user interactions in the new user's profile. Indications of the user's interest or preferences for content items contained in the history of user interactions may be thus obtained by the content provider. For example, a list of media content items for which the user has searched using the previous media content provider (sometimes called "second" media content provider) search engine may be retrieved. In addition, or in the alternative, a list of media content items for which the user has viewed trailers or played snippets, or a list of media content items similar to ones the user watched may be retrieved from the user interaction history. The media content item may be a motion picture, a television episode, a video, a song or other audio content, or the like.

The content recommendation engine may also determine whether the media content item so identified as being of interest to the user has already been streamed or otherwise played for the user by the second media content provider. If the media content item so identified has not been played, for example, has not been transmitted for play to a device associated with the user, then a content recommendation may be generated and displayed automatically on the user's device. The content recommendation engine may also determine, based on the history of user interactions, whether the media content item was unavailable advertisement free for the user from the second content providers system, or was unavailable free of charge from the second provider, or was unavailable at all from the second content provider. This type of unavailability may dictate how the content recommendation engine now recommends the media content item for this user. For example, if it is determined that a reason the user did not consume the media content item may be that the media content item was only available with an extra charge from the second content provider (e.g. pay-per-view), then the recommendation may display the recommended content item as being free of charge but with commercial advertisements embedded in the content item. Conversely, if it is determined that the media content item was available from the second content provider free of charge but with commercials embedded therein, then the content recommendation engine may now display a recommendation for the content item as being available commercial free but on a pay-per-view basis.

A method that provides content recommendations may include:
- receiving by a first content provider, a history of user interactions stored by a second content provider;
- identifying, in the history of user interactions stored by the second content provider, data indicating:
  (i) a preference of a user for a media content item, and
  (ii) an indication that the media content item was not provided for play, by the second content provider, to at least one device associated with the user;
- based on the identifying, selecting, by the first content provider, a content recommendation; and
- causing display, by the first content provider, of the selected content recommendation on at least one of devices associated with the user.

In such a method, the data indicating the preference may include a search for the media content item received from one or more of the devices associated with the user.

In such a method, the data indicating the preference may include a play of a trailer of the media content item at one or more of the devices associated with the user, or may include a search for the media content item received from one or more of the devices associated with the user, and the history indicates that a second media content item, obtained by the search, was provided, by the second content provider, for play to one or more of the devices associated with the user.

Such a method may also include:
- determining, by the first content provider, according to the history, that the media content item was unavailable at all for play at the devices associated with the user from the second content provider, such that the display of the recommendation is caused in response to a determination by the first content provider that the media content item is available for play from the first content provider for one or more the devices associated with the user.

According to an aspect of the disclosure, such a method may also entail determining, by the first content provider, according to the history, that the media content item was unavailable without advertisement for play at the devices associated with the user from the second content provider, such that the display of the recommendation is caused in response to a determination by the first content provider that the media content item is available for play without advertisement from the first content provider for one or more of the devices associated with the user.

Such a method may also include determining, by the first content provider, according to the history, that the media content item was unavailable free of additional charge for play at the devices associated with the user from the second content provider, such that the display of the recommendation is caused in response to a determination by the first content provider that the media content item is available for play free of additional charge from the first content provider for one or more of the devices associated with the user.

Also, in this method may the display of the recommendation is caused in response to a detection of a new user subscription for content of the first content provider.

This method may also include:
- detecting, by the first content provider, one or more of the devices associated with the user;
- in response to the detecting, determining, by the first content provider, that the first content provider lacks a subscription of the user; and
- in response to the detecting, determining, by the first content provider, that the media content item is available for play from the first content provider for one or more of the devices associated with the user,
- such that the display of the recommendation is caused in response to the determining that the first content item is available for play.

According to a further aspect of the disclosure a profile manager of a content service provider's server system, upon detecting a new user subscription, obtains profile information of the subscription from a second media content provider. Based on the profile information so obtained, the profile manager of the content service provider's server system may automatically recommend or automatically create one or more profiles for the subscription, including, for example, names associated with each profile, icons associated with each profile, lists of shows, programs or other content items of interest associated with each profile, user preference data, such as favorite or usually consumed show genres, favorite or usually consumed sports teams, favorite or usually consumed channels or other media sources, associated with each profile, lists of previously viewed/consumed content items associated with each profile, ratings of content items provided by the user, preferred/usual mode of interaction (e.g. speech, remote control, set top controls) and preferred/usual user equipment of user for interacting with the content provider, whether closed captioning or subtitles in a particular language are preferred/usually used by the user, lists of searches associated with each profile, user age, gender and other demographic information associated with each profile, language(s) for interacting with the user, typical viewing/content consumption days/times of the user, and the like. The profile data associated with each user profile may also include parental control information or other restrictions that limit or specify the content items that may be played or that may not be played, and/or that limit or specify the types of content items that may be played and/or that may not be played, and/or limit or specify the times at which content items may be played and/or may not be played for the profile. For example, a user profile associated with a child may be restricted to movies rated "G" or "PG", or may specify that movies other than those rated "R" or "X" be allowed, or viewing may be restricted to certain hours of the day or days of week or the like.

This method of recommending user profiles may include:
- detecting, by a first content provider, a request to create a new user account subscription for a user, the new subscription providing access to content of the first content provider;
- receiving, by the first content provider, subscription data stored for the user by a second content provider;
- determining, by the first content provider, according to the subscription data, a first user profile and a second user profile;

in response to the determining, causing display, by the first content provider, to one or more devices associated with the user:
  a recommendation to create: (a) a third user profile for the new user account with the first content provider based on the first user profile, and (b) a fourth user profile for the new user account with the first content provider based on the second user profile.

In such a method, the first and third user profiles may include an indication of user interest in a first media content item, and the second and third user profiles may include an indication of user interest in a second media content item.

Such a method may also include:
  determining, by the first content provider, that the first user profile comprises a first icon selected for the first user profile;
  automatically selecting, by the first content provider, a second icon corresponding to the first icon; and
  causing display, by the first content provider, of the second icon proximate the third user profile.

In this method, the display may feature an identification of the first content media item in association with the third user profile, and an identification of the second media content item in association with the fourth user profile.

According to an aspect of this method, the determining may include detecting, by the first content provider, that the subscription data indicates that a first content item was not provided, by the second media content provider server system, to one or more of the devices associated with the user;
  based on the detecting, selecting, by the at least first content provider, a content recommendation for the user; and
  causing display, by the first content provider, of the content recommendation to the one or more devices associated with the user.

Such a method may also include detecting, by the first content provider, that one or more of the devices associated with the user is accessing the first content provider through the third user profile;
  detecting a restriction in the subscription data for the first user profile, wherein the restriction was previously associated with a first plurality of content items; and
  in response to both the detecting that one or more devices associated with the user is accessing the first content provider through the third user profile and the detecting of the restriction, preventing, by the first content provider, play of the first plurality of content items to one or more of the devices associated with the user, while enabling play of a second plurality of content items.

Also contemplated is a media content providing service that identifies a content item that is suitable and seems of interest to a user and, if it determines that the content item is unavailable from the library or according to the programming schedule of the media content provider, then determines whether the content item is available from a second media content provider. For example, the media content provider may arrange with one or more partner media content providers to make available some content items to subscribers of the media content provider. The content thus made available may be for a fee paid by the media content provider to the second content provider. The fee may be set according to a price schedule per content item, or for a flat fee on a prearranged periodic basis for a specified number of subscribers, or on a reciprocal basis with the partner content provider(s). The content provider may first determine whether the user has already consumed the content item.

If the media content is available from the second media content provider, then the media content provider may recommend the media content item to the subscribing user. For example, the media content provider may receive cryptographic credentials for accessing the media content item from the second media content provider so that the user can play the media content item. As a practical example, the content provider may wish to reward the subscribing user with an occasional ability to view content items outside of the content library of the content provider or outside of the content broadcast schedule of the content provider. The content item may be accessed via an application on the user's device that is associated with the content provider but is downloaded/streamed/played from a server associated with the second content provider. Or, this content item may be downloaded/streamed/played from the content provider but on an application of the user device associated with the second content provider. Or, the content item may be transmitted to the first content provider and stored thereby for transmission to the user device via an application associated with the first content provider.

This method of providing content items of a second content provider may include:
  identifying, by a first content provider, a content item to be recommended for play at a first content provider application running on one or more devices associated with a subscribing user of the first content provider;
  determining, by the first content provider, that the content item is unavailable for play in the first content provider application directly from a server system of the first content provider;
  in response to the determining, identifying, by the first content provider, an availability of the content item from a second server system of a second content provider for the subscribing user of the first content provider;
  receiving, by the first content provider, from the second server system of the second content provider cryptographic credentials for accessing the content item from the server system of the second provider; and
  enabling play of the content item at the first content provider application running on one or more of the devices associated with the subscribing user, wherein the content item is accessed via the first content item provider application from the server system of the second provider using the cryptographic credentials.

In this method, the cryptographic credentials may contain a time limit for the play of the content item to the at least one or more devices associated with the subscribing user.

In such a method, the cryptographic credentials may contain a user limit restricting the play of the content item to the one or more devices associated with the subscribing user, or may contain a user limit restricting the play of the content item to user devices associated with a class of subscribing users, wherein the class is defined by user demographic information, or may contain a limit restricting the play of the content item to the one or more devices associated with the subscribing user when a recommendation for a second content item is played to the one or more devices associated with the subscribing user, or may contain a limit restricting a number of plays of the content item to the one or more devices associated with the subscribing user to a maximum number of times.

The identifying of the availability of the content item may entail querying for the content item to a database cataloguing media content items available from a plurality of content providers, including the second content provider.

Such a method may include obtaining digital rights, by the first content provider, for play of the first content item.

In such a method, the identifying of the content item may be based on a user search for the content item on one or more of the devices associated with the subscribing user.

This method may further include:
identifying, by a first content provider, a content item to be recommended for play at one or more devices associated with a subscribing user of the first content provider;
determining, by the first content provider, that the content item is unavailable for play for the subscribing user from a server system of the first content provider;
in response to the determining, identifying, by the first content provider, an availability of the content item from a server system of a second content provider;
receiving, by the first content provider, from the server system of the second content provider, a link for accessing the content item, via an application of the second content provider, from the server system of the second content provider; and
enabling play of the content item by transmitting the link to one or more of the devices associated with the subscribing user.

Such method also may include receiving, by the first content provider, from the server system of the second content provider, cryptographic credentials for accessing the content item from the server system of the second provider.

The cryptographic credentials may provide the access to the content item via a temporary user profile for the second content provider; and the cryptographic credentials may contain a time limit for the play of the content item, and/or may contain a user limit restricting the play of the content item to the one or more devices associated with the subscribing user, and/or may contain a user limit restricting the play of the content item to user devices associated with a class of subscribing users, wherein the class is defined by user demographic information, and/or may contain a limit restricting the play of the content item to the one or more devices associated with the subscribing user when a recommendation for a second content item is played to the one or more devices associated with the subscribing user; and/or may contain a limit restricting a number of plays of the content item to the one or more devices associated with the subscribing user to a maximum number of times.

BRIEF DESCRIPTION OF THE DRAWINGS

The above-described and other features of the present invention, its nature and various advantages will be more apparent upon consideration of the following detailed description, taken in conjunction with the accompanying drawings, and in which:

FIG. 14 is a flowchart showing an example of a content play process of a content item from a partner content provider via an application associated with the partner content provider, according to a further embodiment of the disclosure; and FIG. 15 is a flowchart showing an example of a content play process of a content item from a partner content provider via an application associated with the partner content provider, according to this embodiment of the disclosure.

DETAILED DESCRIPTION

Figure 1:
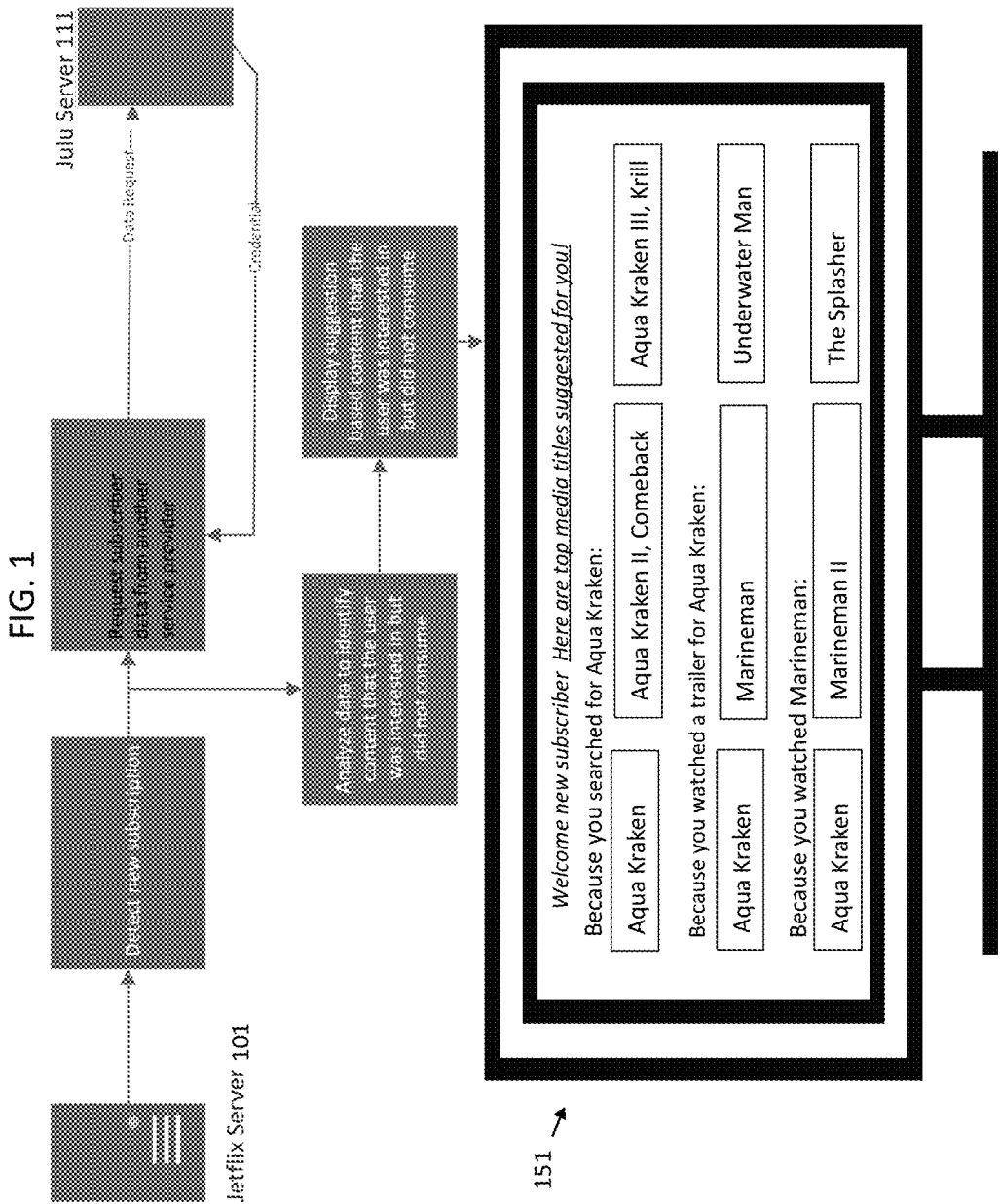
FIG. 1 illustrates an example of a display showing media content recommendations for a user based on user interest data received from a second content provider, according to an aspect of an embodiment of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

Aspects of an embodiment of the disclosure will now be described with reference to the example shown in FIG. 1. Periodically, or occasionally from time to time, a media content service provider may wish to provide content recommendations to a user. For example, upon detecting that a user has newly subscribed to the service provided by a content provider, such as a media streaming service, a cable television provider or other online platform, may wish to suggest content items for play by the user.

As referred to herein, the terms "content item," "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance. Interactive television program guides (sometimes referred to as electronic program guides) are well-known guidance applications that, among other things, allow users to navigate among and locate many types of content or media assets. Interactive media guidance may be graphical user interfaces that enable a user to navigate among, locate and select content.

The processes described herein as being performed by the content provider, the partner or second content provider, the user equipment provider, and the server systems of these providers, may be performed by an application and/or any instructions for performing any of the embodiments described herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage device, solid state device, hard drive, optical drive, a hard disk, floppy disk, USB drive, DVD, CD, media cards, register memory, processor caches, Random Access Memory ("RAM"), etc. Hardware implementations of these processes and implementations combining hardware and software are also contemplated.

FIG. 1 illustrates that Jetflix server associated with the content provider 101 detects a new subscription for the service furnished by the content provider 101. Upon such detection, or upon the occurrence of another content recommendation generation event, for example, when a user rejoins the content provider server for a new session, or at certain fixed intervals, Jetflix server determines that it is time to generate a new content recommendation for the user on user device 151.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media consumption, media recommendations and guidance, interaction with content providers and the like, may be available on these devices, as well. The content, content recommendations and guidance, interactions may be for content available only through a television, for content available only through a computer monitor or through one or more of other types of user equipment devices, or for content available both through a television and computer monitor or other types of user equipment.

As referred to herein, the phrase, "content item recommendation" or "media content recommendation" should be understood to mean any display or discernable signal related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, popup ads, etc.), on-demand information, blogs, websites, and any other type of guidance data that is helpful for a user to navigate among and locate desired content selections.

A content provider may provide programming according to a schedule, such as television or cable programming, and non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider Internet content may include web events, such as a chat session or Webcast, or content available on-demand as streaming content or downloadable content through an Internet web site or other Internet access (e.g. FTP).

Jetflix server 101 may determine that it has no content recommendations for this user, or that it has a number of content recommendations below a threshold amount, and that therefore it would be desirable to have additional content recommendations for the user. Content provider 101 may retrieve user profile information from user equipment device to determine whether any user interest in content items has been stored in applications of the user equipment.

As shown in FIG. 1, Jetflix server may then request subscriber data from a partner service provider. Jetflix server 101 thus transmits a data request to second content provider 111, shown in FIG. 1 as Julu server. In some embodiments, content provider 101 may determine an importance value for one or more partner content providers based on a number of successful media recommendations, the number of times the user has logged into or requested content from the partner content provider, whether the partner content provider is a paid subscription service, whether the partner content provider offers multiple formats of content, or any suitable combination of such factors, and choose one or more such second content provider(s) accordingly for requesting the user data.

Jetflix server 101 may prompt the user to provide a list of content providers with which the user currently has, and/or in the past had, a subscription or content providers from whom user has otherwise consumed media content. User may be provided an option to select one or more content providers from which content provider 101 is to retrieve content recommendations, and/or from which to retrieve user profile names and/or from which to retrieve other user profile data for users associated with the subscription. In some embodiments, content provider 101 may ping partner content provider servers through communications network to determine whether any of those content providers have user data for the user. In some embodiments, content provider 101 may identify content providers that may have user data for the user by analyzing user profile information to determine which, if any, content providers have sent the user media recommendations. The content providers may have a previous arrangement for exchanging such user data, for example, when content provider or the provider content provider has a new subscriber.

FIG. 1 also illustrates that Jet flicks server 101 then receives user data for this user from Julu server 111 and that it analyzes this user data to identify media content that the user has expressed an interest in but has not previously consumed. User interest for a content item may be determined in a variety of ways. For example, if the user has searched for the content item, if the user has consumed a trailer or a snippet of the content item, if the user has rated highly the content item, or if the user has consumed a content item that is similar in some way to the content item, for example, if the content item features the same sports team or the same sports league or sports season, or shares the same director, or is part of the same broadcast season, or the like. By way of further example, if the user has rated highly a content item that is similar in some way to the content item, if the user has watched another episode or in other content item of the same series as the content item, this may show user interest in the content item. A content item may be similar to a previously consumed content item if both content items feature the same artist, the same actor, the same producer, the same genre, the same writer, the same score writer or a similar demographic of users has rated highly both of the content items.

According to an aspect of this embodiment, if the content item has been frequently recommended to the user by the second content provider 111 and the user failed each time to watch the recommended content item, this information may also be transmitted as user information to the content provider 101. This failure to engage with the content item may indicate that the user is uninterested in the content item and thus content provider 101 may decide not to recommend it. Content provider 101 may identify media recommendations generated by second content provider and remove recommendations that the user has scrolled over or been shown and decided not to view. In an embodiment, content items in which the user has shown some interest in the second content provider's system 111 are ranked according to how recently the user showed interest in each one. For example, content items in which the user showed interest in the second provider's system 111 more recently are recommended first by the content provider 101. In some embodiments, a time duration cutoff window may be set so that content items in which the user showed interest longer than the time duration cutoff window are not recommended by the content provider. The time duration may be user designated or may be automatically designated by the content provider 101.

Next, content provider 101 may determine whether the user has previously consumed this content item. Such determination may be made based on the user data received from the second provider 111, or content provider 101 may inquire of the user device whether the user has already played this content item. If it is determined by content provider 101 that this user has not previously consumed the content item, then content provider 101 may generate a display recommending one or more content items based on this determination, as shown in display of user device 151 of FIG. 1. As shown in FIG. 1, the content item recommended is the content item that is determined to be not previously consumed by the user (sometimes referred to as the "target" content item). According to an aspect of the disclosure, the recommendation may include also additional content items similar to the target content item. The similarity may be of the similarity type above discussed. As shown in FIG. 1, the display of user device 151 may display sets of recommended content items based on the target content item. These sets may be grouped according to how the user had expressed interest in the original target item. Display of user device 151 illustrates that some recommended content items are shown because the user had searched for the target content item, some recommended content items are shown because the user had watched a trailer for the target content item, and some recommended content items are shown because the user had watched a content item similar to the target content item.

A user may indicate a desire to access a recommended content item by selecting a selectable option provided on a display screen (e.g., a menu option, a listings option, an icon, a hyperlink, etc.) or pressing a dedicated button (e.g., a GUIDE button) on a remote control or other user input interface or device. In response to the user's indication, the content provider server 101 may generate play of the content item.

In an embodiment, a user device and/or a content provider may provide a profile assist feature. A profile assist file or data structure (e.g., JSON) in response to an API call from the first content provider may be issued. For example, such an API call can take place when a user engages with opens an app and starts browsing a content provider to decide whether to subscribe. The first content provider may then parse the file for content items (e.g., titles that were searched for and not viewed) and match that against its own content library. For example, in one embodiment, the recommendation engine may use at least one of the content titles (e.g., most recent searches for unavailable content) as a seed to recommend content items that the user is likely to start watching right away or soon, or that may be of interest.

Not all content items for which the user had searched may be included into the 'profile-assist' file. For example, there may be instances where a user searched for a kid's title, but the user does not usually watch such content (in this instance the search was a onetime experience, occurring because the user might have kids visiting and they performed such search). Therefore, such search query may be afforded little to no weight. However, if repeated often or if a new pattern (searches or consumption of kids content) re-emerges, then considerable weight may be afforded to such searching, or to such repeated manifestations of user interest in such content. However, searching for Aquaman and then watching a movie similar to Aquaman (e.g., Wonder Woman, Thor, etc.)

because the movie was not available, might increase the weight for Aquaman within the 'Profile Assist' file or database.

In addition, this profile assist file or data may be considered premium data that the device (e.g., Roku streaming player) or the content provider may make available to all apps to query. Such data does not necessarily include any personally identifiable information and may be associated with a device ID or general temp identifier.

Figure 2:
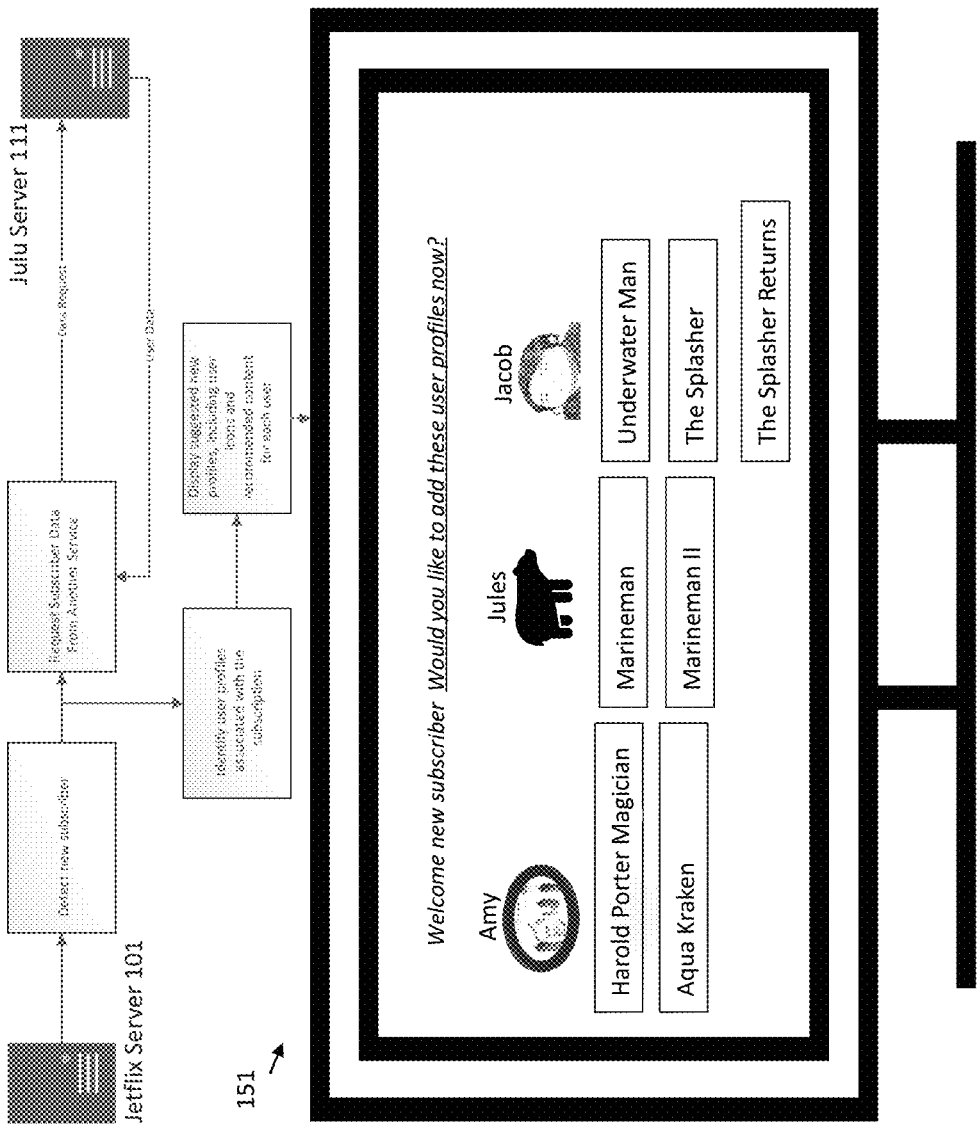
FIG. 2 illustrates an example of a display showing user profile recommendations based on data received from a second content provider, according to an aspect of another embodiment of the disclosure.

Another embodiment of the disclosure is illustrated in FIG. 2. Upon detecting a new user subscription, Jetflix server 101 may suggest user profiles for users who share the subscription. Jetflix server 101 may detect a new subscriber and may then request subscriber data from a second content provider 111, in this case shown as Julu server 111. As discussed with regard to the embodiment shown in FIG. 1, Jetflix server 101 may determine which partner content provider(s) has/have user data in several ways, and may determine from which partner content provider(s) to request the user data in several ways. As also discussed with regard to the embodiment shown in FIG. 1, the first and second content providers 101, 111 may contract in advance for exchanging such information as part of a mutual exchange of such information or for and negotiated price. As also explained with regard to the embodiment illustrated in FIG. 1, content provider may contact a user data exchange where several content providers pursuant to an agreement share information about users. Julu server 111 then provides the user data to Jetflix server 101.

Jetflix server 101 identifies user profiles associated with the subscription. Jetflix server 101 then displays the suggested new profiles for the subscription based on the subscriber data that was received from Julius server 111. As shown in display 151 of user device in FIG. 2, these recommendations for user profiles are then displayed to the user. Each user profile may include a name, a photo, image or other type of icon that the user had uploaded or had otherwise selected in the second content provider system 111. The profile may also include one or more recommendations for content items also based on the user data received from the partner content provider, in this case Julu server 111. In addition, for each user profile, user preferences identified in the user data obtained from Julu server 111 may contain genres of content items preferred by the user, user demographics, such as age, gender, languages spoken by the user, previously viewed content items by the user, and other such user profile data, as explained above. Additional information associated with each user profile may be parental controls, such as restrictions limiting content items that may be played, the genre or rating of content items that may be played, and the times of the day or days of the week during which content items may be played.

Figure 3:
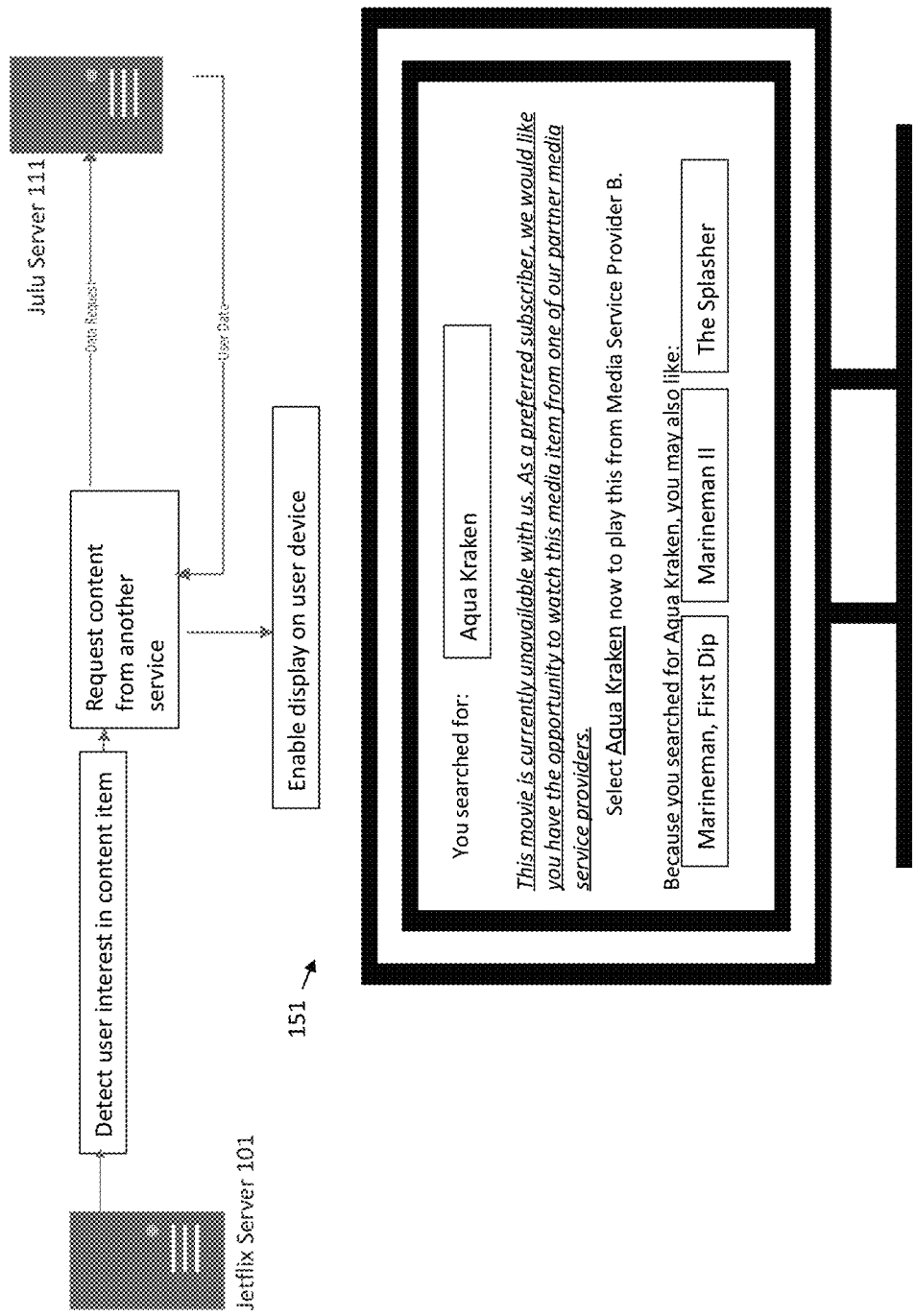
FIG. 3 illustrates an example of a display showing media content item recommendations available from another content provider, according to an aspect of a further embodiment of the disclosure.

FIG. 3 illustrates that content provider 101, illustrated as Jetflix server, may enable display of a content item from the second content provider, Julu 111, when the content item is unavailable from the content provider (Jetflix) 101.

Jetflix server 101 may determine that a content item may be of interest for a user. For example, the user may search for the content item on Jetflix server 101 or may express interest in the content item in other ways, such as by searching for the content item, by watching a trailer for the content item, or by watching another content item that is similar in some way (as described elsewhere herein) to the content item. Jetflix server 101 may then determine that the content item is currently unavailable in the Jetflix server library or according the programming schedule provided by Jetflix server 101.

The content provider 101 may also determine that it wishes to make available to the user an out-of-network content item. For example, as an incentive to subscribe to the content provider, it may commit to a specified number of content items external to what is what available from the content provider 101, or may wish to encourage loyalty to the content provider by providing a set number of content items that are not ordinarily available on the system of the content provider. As shown in FIG. 3, content provider 101 may then request the content item from the second content provider 111. As shown in FIG. 3, Jetflix server 11 queries Julu server 111 for the content item.

Jetflix server 101 may automatically choose the second content provider based on stored data indicating that the user has been a subscriber in the past with the second content provider. In some embodiments, content provider 101 may ping content provider servers to determine whether any of those content providers store the content item. In some embodiments, content provider 101 may identify available content providers with the content item by analyzing user profile information to determine which, if any, content providers have sent the user media recommendations. In some embodiments, content provider 101 may query one or more of the available content providers to determine whether the content is accessible as per a previously agreed arrangement with content provider 101. Content provider 101 may select the first partner content provider 111 that responds. Or, content provider 101 may query some or all of the available content providers to determine which content provider is capable of transmitting the content to a requesting user equipment device at the fastest rate and select that content provider, or may select a content provider based on aspects of the user equipment that is requesting the content. For example, if user equipment is a mobile device that is requesting the content, content provider 101 may select the second content provider 111 that has a particular format of the content that is most compatible with or most suitable for presentation on user device.

Julu server 111 responds with the content item or responds with cryptographic credentials providing access to the content item on Julu server 111. The cryptography credentials may also provide access to download an application associated with Julu server 111 to user device or for otherwise accessing the content item via user device, such as via a deep link to the content item on Julu server 111.

Upon receiving a copy of the content item from Julu server 111, or upon receiving the cryptographic credentials to access Julu server 111, Jetflix server 101 may then enable display of the content item on the user device.

Figure 4:
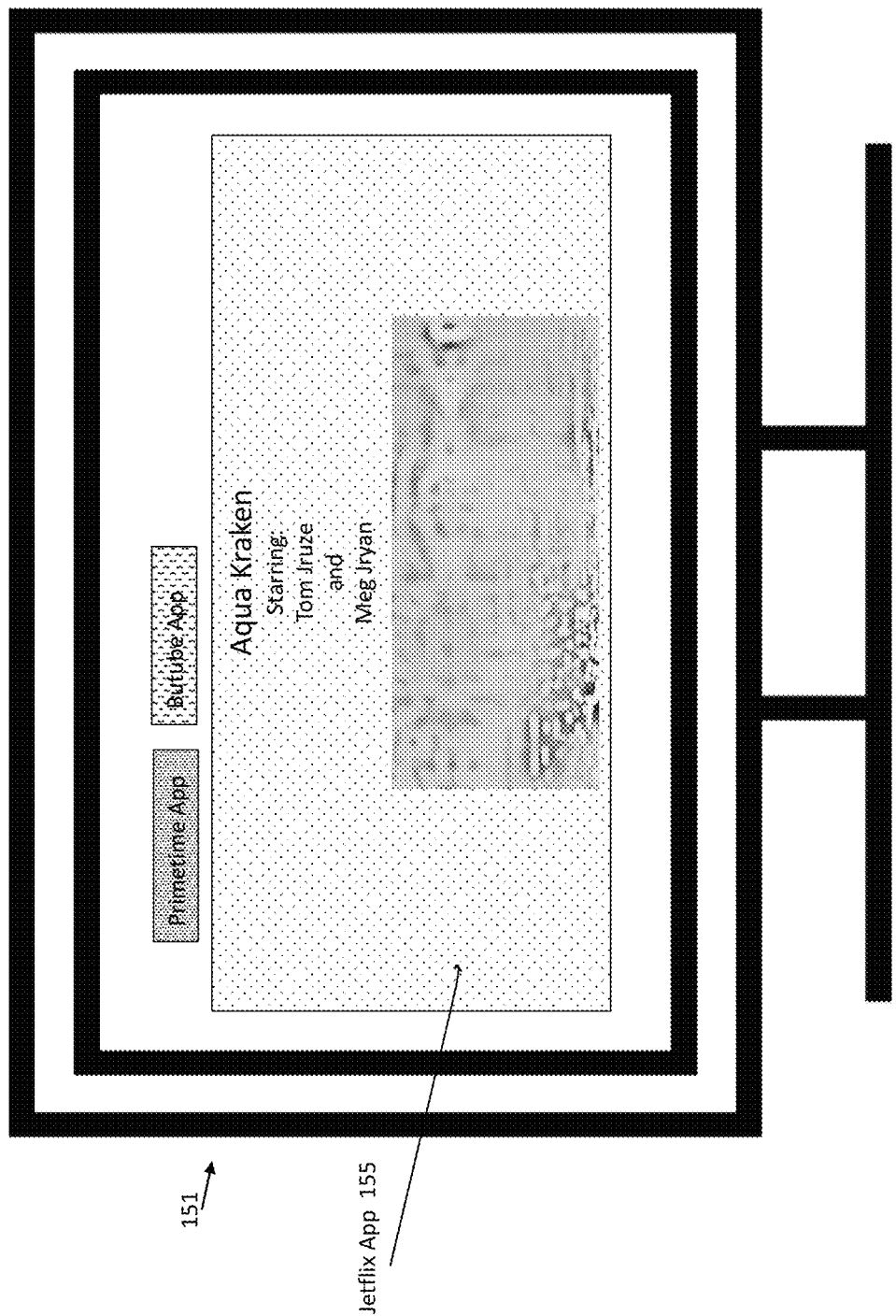
FIG. 4 illustrates an example of a display showing media content item recommendations available from a second content provider, according to an aspect of the embodiment shown in FIG. 3, playing on an application associated with the media content provider, according to an aspect of the disclosure.

FIG. 4 illustrates that according to a first aspect of this embodiment, the user may access the content item from Julu server 111 via the application 155 associated with Jetflix server 101 on user device. According to this aspect of the embodiment, the Julu server 111 has provided access to view or to download the content item from Julu server 111 via the Jetflix app 155 on user device. For example, Julu server 111 may provide a deep link to Julu server 111 where the content item is available via the Jetflix app on user device 151.

Figure 5:
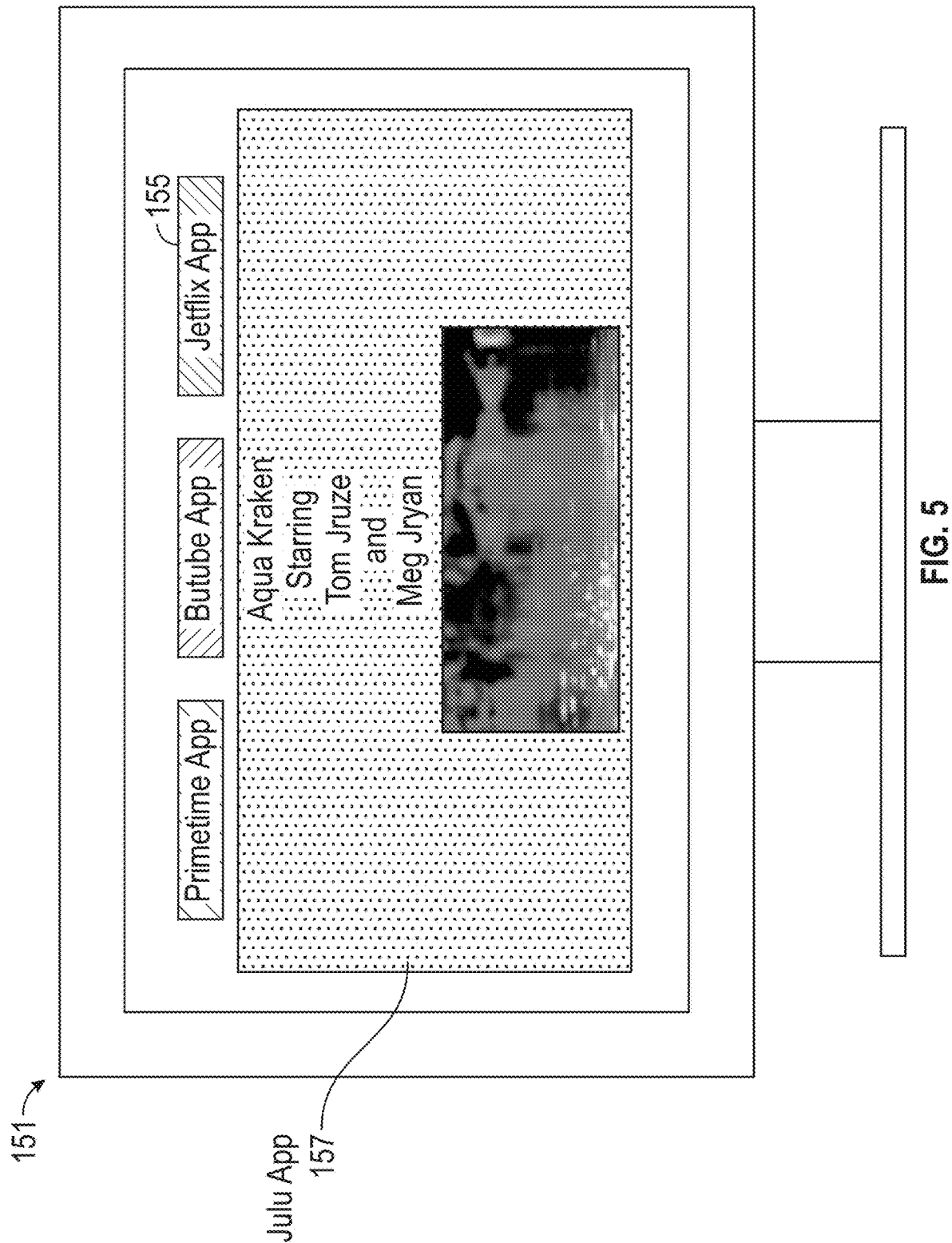
FIG. 5 illustrates an example of a display showing media content item recommendations available from a second content provider, according to an aspect of the embodiment shown in FIG. 3, playing on an application associated with the second media content provider, according to an aspect of the disclosure.

FIG. 5 illustrates another aspect of the embodiment, in which Julu server 111 enables the downloading of the Julu app 157 onto user device to view the content item. Julu server 111 may provide cryptographic credentials required to download and to use the Julu app 157. The Julu app 157 may be freely available for download but accessing content thereon may require a subscription, however the cryptographic credentials provided may enable limited access for the content item.

According to an aspect of the disclosure with regard to this embodiment, limited access to the content item may be provided using the cryptographic credentials. Access to the content item may be limited by the cryptographic credentials to one or more plays of the content item, and/or for a period of time, such as, for example, for 48 hours, or a week or the like. Access may be limited to a single user profile within the subscription. The cryptographic credentials may also limit access in other ways, for example, to disable downloading of the item onto user device 151 or to limit viewing to one time without repeated play.

Figure 6:
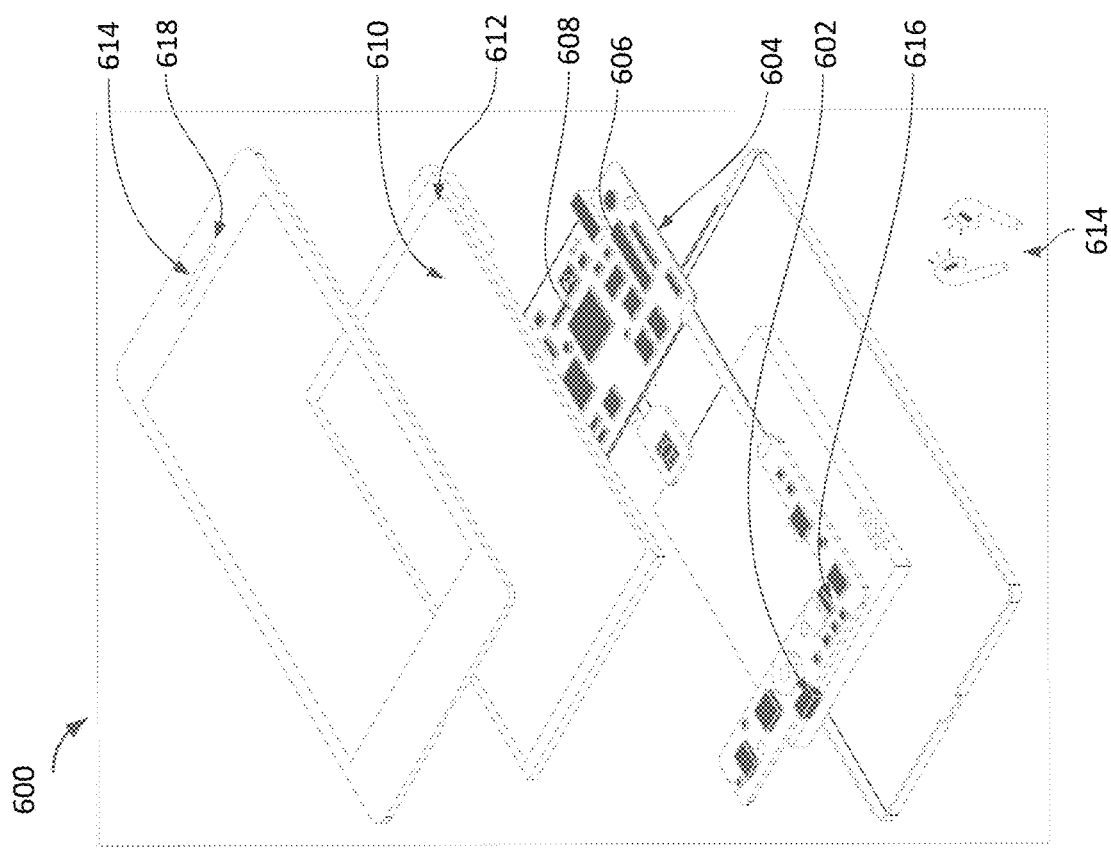
FIG. 6 is a block diagram illustration of an example of user equipment in accordance with an aspect of the disclosure.
Figure 7:
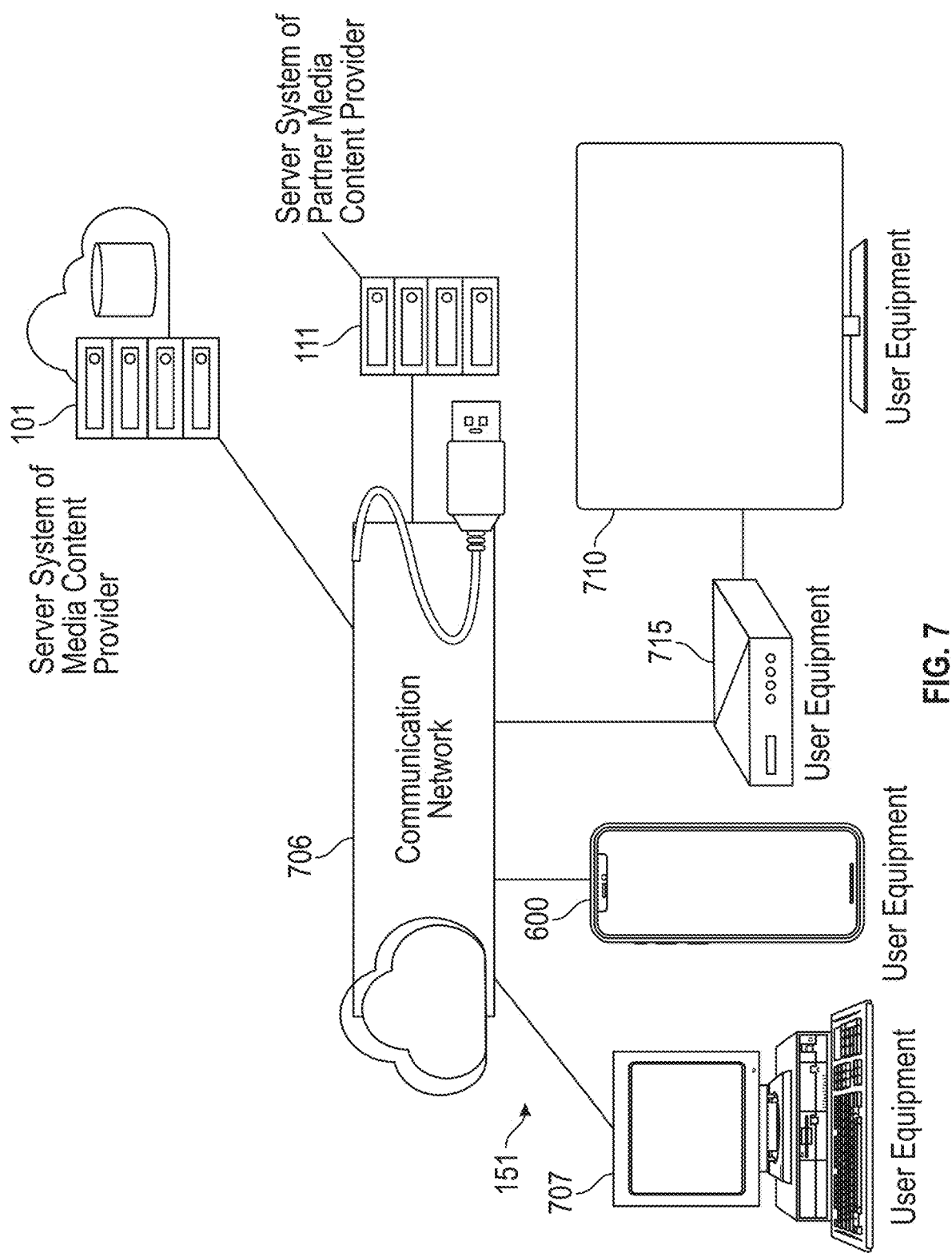
FIG. 7 is a block diagram illustration of an example of a media system in accordance with an aspect of the disclosure.

FIGS. 6-7 describe illustrative devices, systems, servers, and related hardware for the systems and methods described herein. FIG. 6 illustrates generalized embodiments of user equipment 600, described by way of example as a handheld device, such as a cellphone, but may be implemented as other user equipment described herein. For example, user equipment 600 may be a tablet, a virtual reality or augmented reality device, or any other suitable device capable of processing video data. In another example, user equipment device 600 may be a user television system or device 710 as shown in FIG. 7. User television 710 may include set-top box 715, also shown in FIG. 7. User equipment 600 may comprise, or may be communicatively connected to structures shown in FIG. 6, including, microphone 616, audio output equipment (e.g., speaker or headphones 614), and/or display 612. In some embodiments, display 612 may be a television display or a computer display. In some embodiments, set-top box 715 shown in FIG. 7 may be communicatively connected to user input interface 610 shown in FIG. 6. In some embodiments, user input interface 610 may be a remote-control device. Set-top box 715 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each user equipment device may receive content and data via input/output (I/O) path 602 that may comprise I/O circuitry (e.g., network card, or wireless transceiver). I/O path 602 of user equipment 600 may provide content (e.g., broadcast programming, on-demand programming, Internet content, content available over a local area network (LAN) or wide area network (WAN), and/or other content) and data to control circuitry 604, which may comprise processing circuitry 606 and storage 608. Control circuitry 604 of user equipment item 600 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing. While set-top box 715 is shown in FIG. 7 for illustration, any suitable computing device having processing circuitry, control circuitry, and storage may be used in accordance with the present disclosure. For example, set-top box 715 may be replaced by, or complemented by, a personal computer (e.g., a notebook, a laptop, a desktop), a smartphone, a tablet, a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 604 executes instructions for stored in memory (e.g., storage 608). Specifically, control circuitry 604 may be instructed by an application to perform the functions discussed herein. In some implementations, processing or actions performed by control circuitry 604 may be based on instructions received from an application associated with one or more of the content providers 101 and/or 111.

Figure 10:
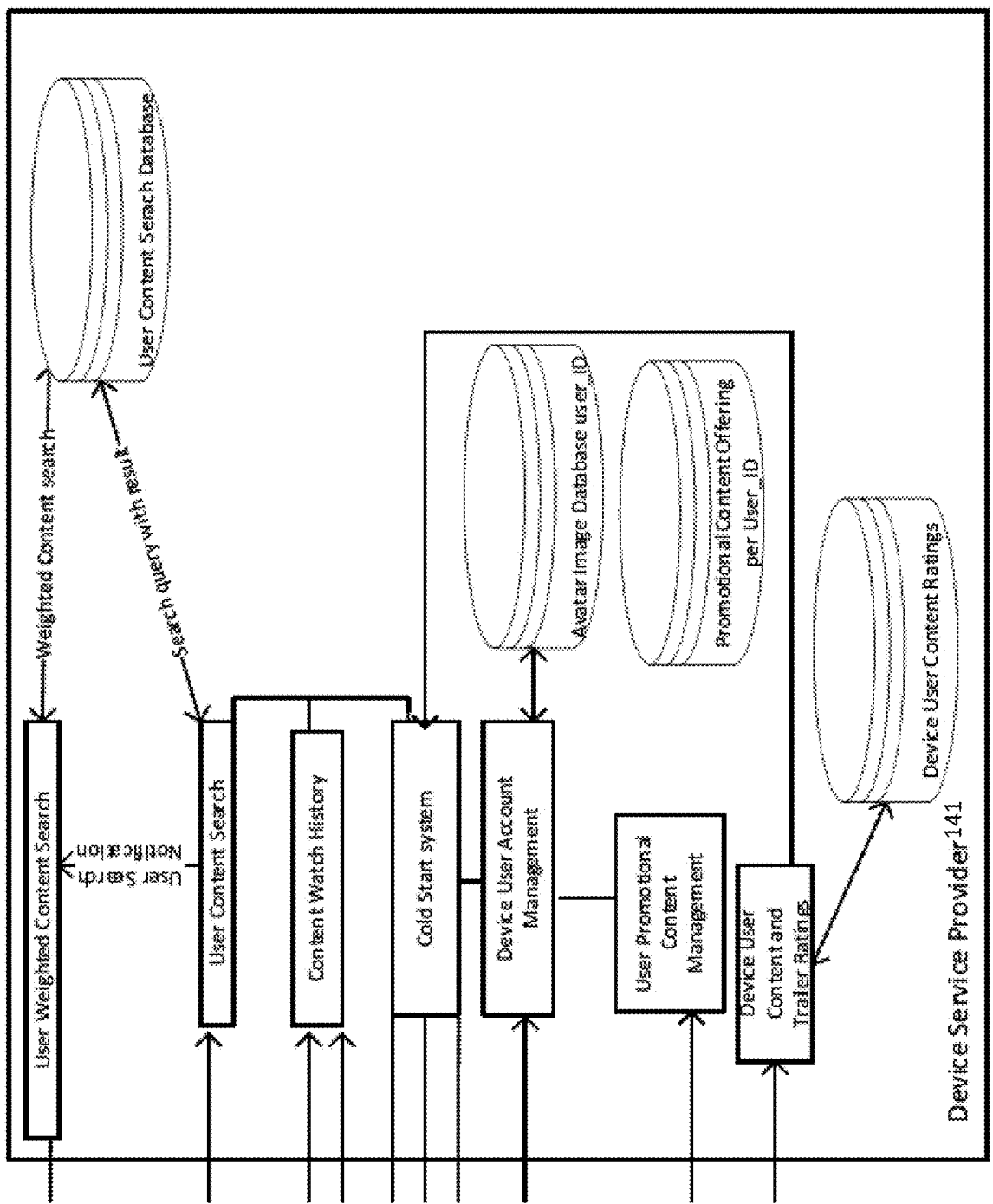
FIG. 10 illustrates an example of a server system of a user device provider, according to an aspect of the disclosure.

In client/server-based embodiments, control circuitry 604 may include communications circuitry suitable for communicating with a server or other networks or servers, including with the content providers 101 and/or 111, and/or with device service provider 141 (shown in FIG. 10). The application associated with one or more of the content providers 101 and/or 111 may be a stand-alone application implemented on a device or a server. The application associated with one or more of the content providers 101 and/or 111 may be implemented as software or a set of executable instructions. The instructions for performing any of the embodiments discussed herein of the application associated with one or more of the content providers 101 and/or 111 may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a device 600.

In some embodiments, the application associated with one or more of the content providers 101 and/or 111 may be a client/server application where only the client application resides on device 600 (e.g., device 104), and a server application resides on an external server (e.g., server 101 and/or server 111). For example, the application associated with one or more of the content providers 101 and/or 111 may be implemented partially as a client application on control circuitry 604 of device 600 and partially on server 101 as a server application running on control circuitry 611. Server 101 may be a part of a local area network with one or more of devices 600 or may be part of a cloud computing environment accessed via the internet. In a cloud computing environment, various types of computing services for performing searches on the internet or informational databases, providing applications associated with one or more of the content providers 101 and/or 111 generation, providing storage (e.g., for a database) or parsing data (e.g., using machine learning algorithms described above and below) are provided by a collection of network-accessible computing and storage resources (e.g., content provider server 101 and/or second content provider server 111), referred to as "the cloud." Device 600 may be a cloud client that relies on the cloud computing capabilities from content provider server 101 to determine whether processing (e.g., at least a portion of virtual background processing and/or at least a portion of other processing tasks) should be offloaded from the mobile device, and facilitate such offloading. When executed by control circuitry of server content provider server 101 or second content provider server 111, the application associated with one or more of the content providers 101 and/or 111 may instruct control 611 or 618 circuitry to perform processing tasks for the client device and facilitate the methods described herein.

Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry.

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as application associated with one or more of the content providers 101 and/or 111 data described above. Nonvolatile memory may also be used (e.g., to launch a boot-up routine and other instructions). Cloud-based storage, described in relation to FIG. 6, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of user equipment 600. Control circuitry 604 may also include digital-to-analog converter circuitry and analog-to-digital converter circuitry for converting between digital and analog signals. The tuning and encoding circuitry may be used by user equipment device 600 to receive and to display, to play, or to record content. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment device 600 and user equipment device 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 715.

Audio output equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of device 600 and equipment 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604.

The application associated with one or more of the content providers 101 and/or 111 may be implemented using any suitable architecture. For example, it may be a stand-alone application wholly implemented on each one of user equipment device 600 and user equipment device 601. In such an approach, instructions of the application may be stored locally (e.g., in storage 608), and data for use by the application is downloaded on a periodic basis (e.g., from an out-of-band feed, from an Internet resource, or using another suitable approach). Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application associated with one or more of the content providers 101 and/or 111 may be downloaded and interpreted or otherwise run by an interpreter or virtual machine (run by control circuitry 604). In some embodiments, the application associated with one or more of the content providers 101 and/or 111 may be encoded in the ETV Binary Interchange Format (EBIF), received by control circuitry 604 as part of a suitable feed, and interpreted by a user agent running on control circuitry 604. For example, the application associated with one or more of the content providers 101 and/or 111 may be an EBIF application. In some embodiments, the application associated with one or more of the content providers 101 and/or 111 may be defined by a series of JAVA-based files that are received and run by a local virtual machine or other suitable middleware executed by control circuitry 604. In some of such embodiments (e.g., those employing MPEG-2 or other digital media encoding schemes), application associated with one or more of the content providers 101 and/or 111 may be, for example, encoded and transmitted in an MPEG-2 object carousel with the MPEG audio and video packets of a program.

FIG. 7 is a diagram of an example of a system 700 in accordance with some embodiments of this disclosure. User equipment 707, 600, 715, 710 may be coupled to communication network 706. Communication network 706 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although not all communications paths are drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 706.

Figure 8:
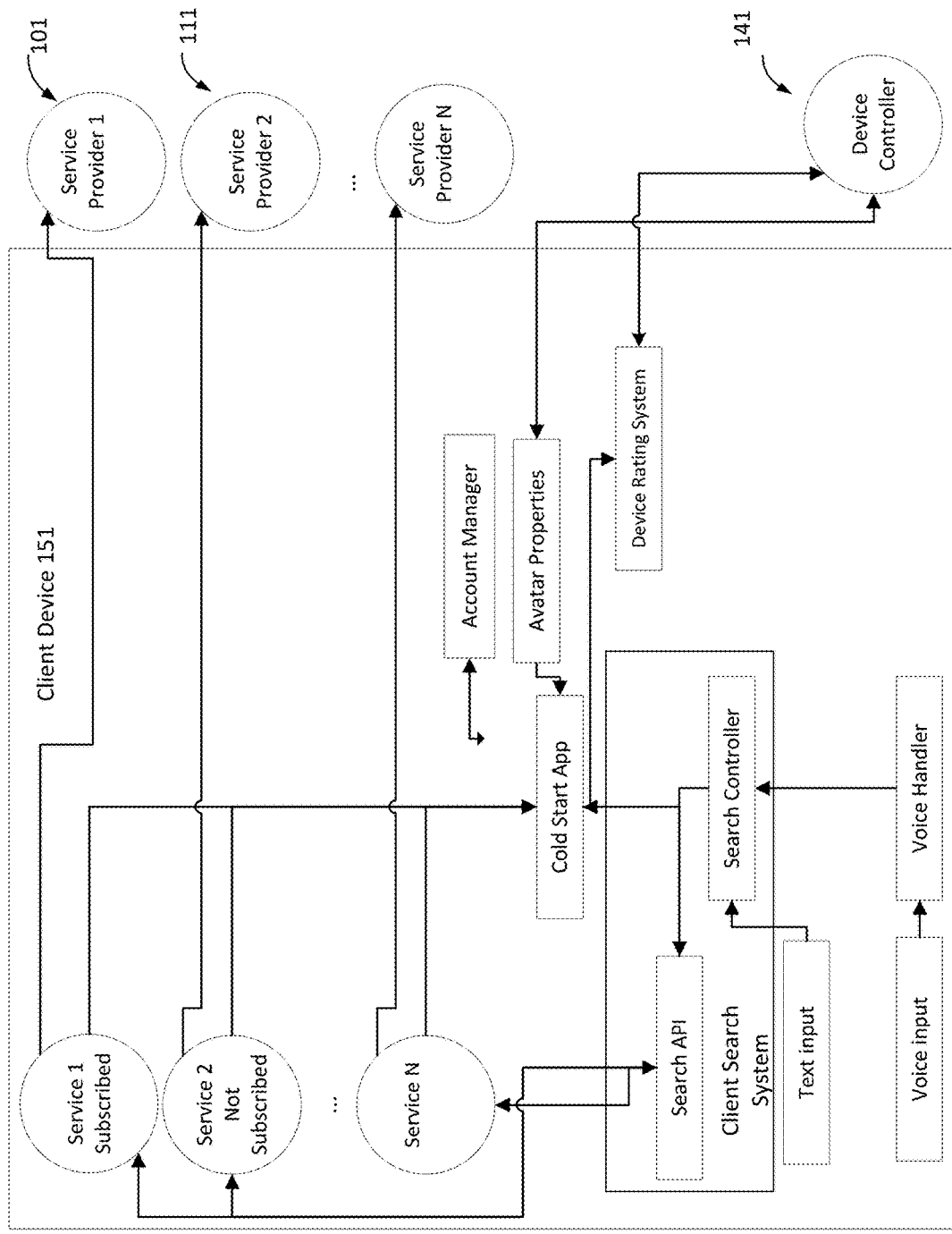
FIG. 8 illustrates an example of a system diagram of data/process flow, according to an aspect of the disclosure.

FIG. 8 illustrates communication and process flows between service providers 101, 111 . . . N, and applications or services, service 1, service 2, service N, of client device 151. Client device 151 may be subscribed to service provider 1 (content provider 101), and may interact with and play content of service provider 1 using application/service 1. Client device may also interact with and play content of service provider 2 (second content provider 111) using application/service 2. In addition, client device 151 may also communicate with device controller 141. For example, device controller 141 may be a modem, WiFi router, or set top box provider, or an ISP (Internet service provider) associated with a network through which client device 151 connects with the content providers.

As shown in FIG. 8, client device 151 may receive a command from a user, for example via text input or voice input. The input from user may be a search request for content item. Client device 151 may also have a program for handling a cold start, as discussed above. Client device 151 may also include an avatar manager to handle avatar properties associated with user profiles and an account manager to handle subscription account transactions with the service providers and with device controller system 141. In addition, client device 151 may include a device rating system to receive user ratings of content items consumed by users associated with client device 151. It will be understood that the applications and services described in FIG. 8 with regard to client device 151 may be provided instead, or in addition, on one or more of the content provider servers or on servers associated with the device controller 141. In addition, while three content providers are illustrated and three applications associated with content providers are shown for client device 151, more or fewer than this number may be provided.

Figure 9:
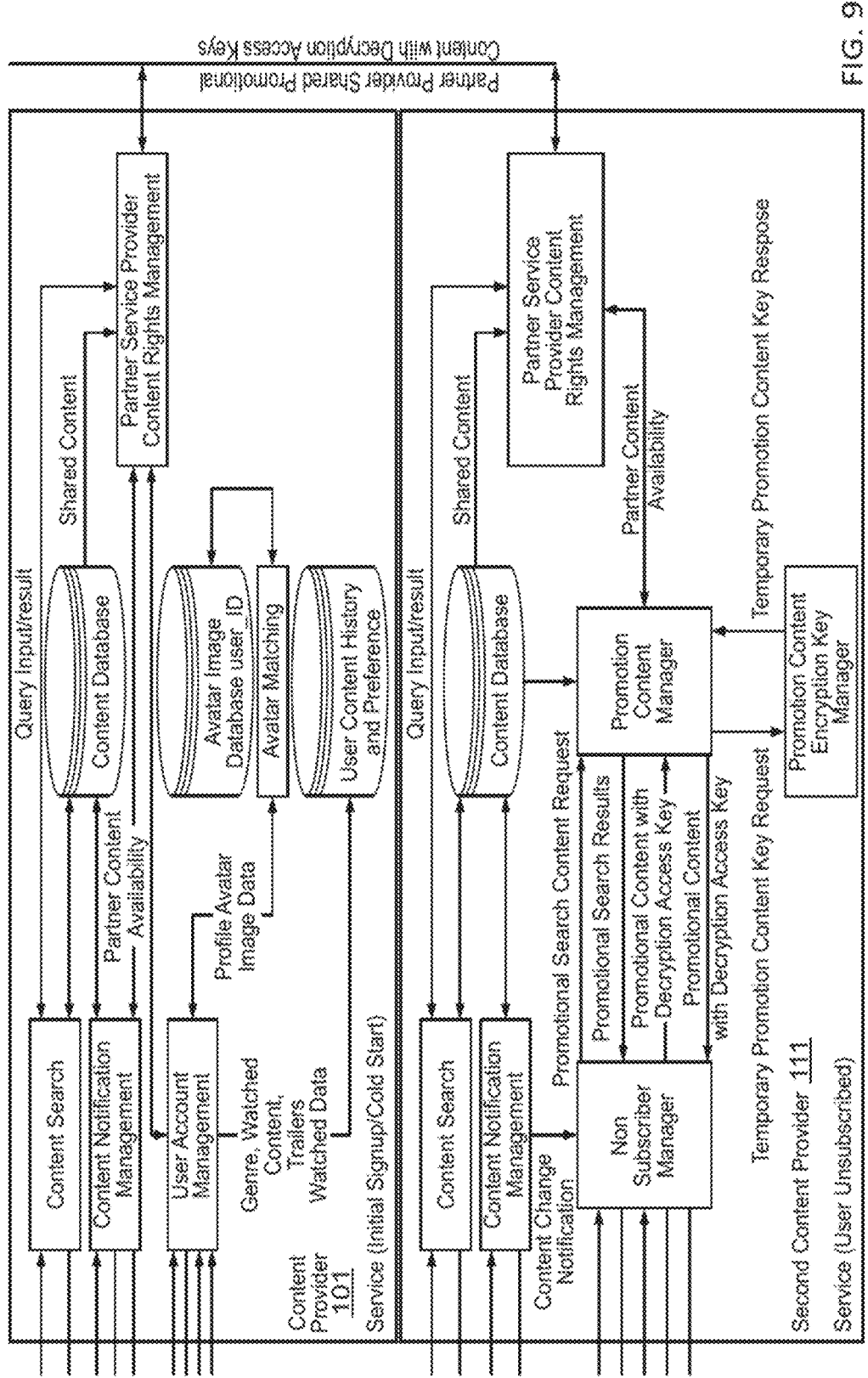
FIG. 9 illustrates an example of a content provider server system and a partner content provider server system, according to an aspect of the disclosure.

FIG. 9 shows structures and processes of the service provider 101 and of second service provider 111. Service provider 101 may include one or more databases or may be communicatively coupled therewith, including a content database, which may store media and other content items, as well as trailers, ads, and other promotional material for the content items; a user content history and preference database, which may store a history of user interactions searching for, requesting, consuming, paying for, and rating content items, and other user data as discussed herein; an avatar image database, which may store user profiles including user demographic data for each user associated with a subscription, photographs, images or other types of avatars associated with users, and other user profile information, as described herein.

Shown in FIG. 9 also is a content search received from a user device to which service provider 101 using content database may provide content to client device 151. Contact notification management process of service provider 101 may communicate with client device 151 to provide recommendations or suggestions for content, and may trigger communication with partner content providers to request user interaction histories, user profiles, and/or content items unavailable from content provider 101. User account management of service provider 101 may handle subscription issues and may initiate the cold start process for recommending content upon cold start upon initial subscription of a user to service provider 101. Also shown in FIG. 9 is an avatar matching process in which, using the avatar image database, an avatar and other profile information may be recommended for users on client device 151.

FIG. 9 also shows structures and processes of second content provider 111. As discussed above, user associated with client device 151 may or may not be a current subscriber of second content provider 111. However, as discussed, second provider 111 may provide user data, such as user preference data as part of a history of user interactions, to content provider 101 upon request of content provider 101, for example, upon cold start of user as new subscriber with content provider 101. In addition, second content provider 111 may provide content items a requested by content provider 101, either directly via an application of second content provider 101 on user device 151 or via content provider 101 using cryptographic credentials to user device 151 for accessing second content provider 111.

FIG. 9 further illustrates that second content provider 111 has a promotion content manager process for promoting recommendations for content and other promotional material, such as ads (e.g. trailers or other short clips describing content, banners, PIP information, etc.) directly to consumers of content via non subscriber manager, to non-subscribing user devices, for example, as part of a partnership arrangement with content provider 101. For example, second content provider 111 may arrange with content provider 101 to promote media content available on second content provider 111 to subscribers of content provider 101. In exchange for such promotional content being pushed to subscribers of content provider 101, second content provider 111 may be required to provide a certain number of media content available on second content provider 111 to subscribers of content provider 101, as described with regard to the embodiment of FIGS. 3-5. With respect to the embodiment of FIGS. 3-5, also shown in FIG. 9 is promotion content encryption key manager, which provides cryptographic credentials as needed for accessing content available on second content provider 111 to subscribers of content provider 101.

FIG. 10 illustrates structures and process flows associated with device service provider 141, which may provide one or more devices used by a user as part of user equipment 151 (as shown in FIGS. 6 and 7). Device service provider 141 may provide such equipment as part of an agreement with content provider 101 for providing subscribers of content provider 101 with Wi-Fi routers, modems, set-top boxes, laptops and other equipment. Device service provider 141 may include a user content search database that handles searches received search requests received from user device 151. For example, device service provider 141 may have user content search database store a list of content items available at service provider 101. In this way, upon receiving a user search request, device service provider 141 may inform user device 151 as to whether the media content item is available at one or more content providers. The search may be weighted according to information stored for the user, for example, past content consumption habits of this user, to provide more accurate results for the user seeking content. Device service provider 141 may handle a content watch or consumption history of user using user device 151. Device service provider 141 may also have an avatar image database for users that are subscribers of an affiliated content provider 101 or for users associated with either devices that are rented, sold or managed by device service provider 141. Additional user profile data may be stored therein, as well as a history of user interactions. Upon detecting a new user subscription or upon detecting a user request to create profiles for each user associated with a content provider subscription, as discussed with respect to the embodiments shown in FIGS. 1 and 2, content provider 101 may request such information from device service provider 141. Similarly, device service provider 141 may have a promotional content offering database that has promotional material, such as trailers or other types of ads for content items of affiliated content providers. Also, device service provider 141 may have access to a device user content rating database that stores ratings that users award to content items after they have consumed them.

Device service provider 141 may incorporate one or more of the applications and services above-described for user equipment 151 and for content provider 101 and second content provider 111. Device service provider 141 may include a content search process that may receive search requests for content items from user equipment 151 and may store user consumption history or watch history of content items based on user patterns at user device 151. Also, content device service provider 141 may manage cold start process for user device 151 and content provider 101. Device service provider 141 may already have stored much of the history of user interactions with regard to media and other content items, and user profile information, including user names and avatars, that content provider 101 seeks.

A system illustrating content provider 101, second content provider 111, and a user device interacting via communications network 1131 will now be described with respect to FIG. 11. Content provider 101 may include control circuitry 1103, which may include communication circuitry 1115, processing circuitry 1107, and memory 1109. Communication circuitry 1115 may handle input/output with other nodes of the system via communications network 1131. That is, communication circuitry 1115 of control circuitry 1103 may use Internet Protocol or other processes to communicate with user device 151 and with second content provider 111.

Processing circuitry 1107 of control circuitry 1103 may provide features, discussed above, including cold start operations handling for user device 151, manage interactions with second content provider 111 for receiving user history data, user profile data, and for receiving content, and also may provide content recommendations and content items to user device 151.

Memory 1109 may be used by control circuitry 1103 for storing user profiles, including user search information, user preferences, user icons, consumption histories generated based on interactions directly with user device 151 and as received from second content provider 111. Memory 1109 may also store content items and content item recommendation promotional material to be transmitted to user device 151, as well as applications for downloading to user devices that are then used for accessing, interacting with and consuming content provided by content provider 101. Also, one or more features described with regard to communication circuitry 1103 and/or processing circuitry 1107 may be implemented as non-transitory processor-readable instructions stored in memory 1109.

Figure 11:
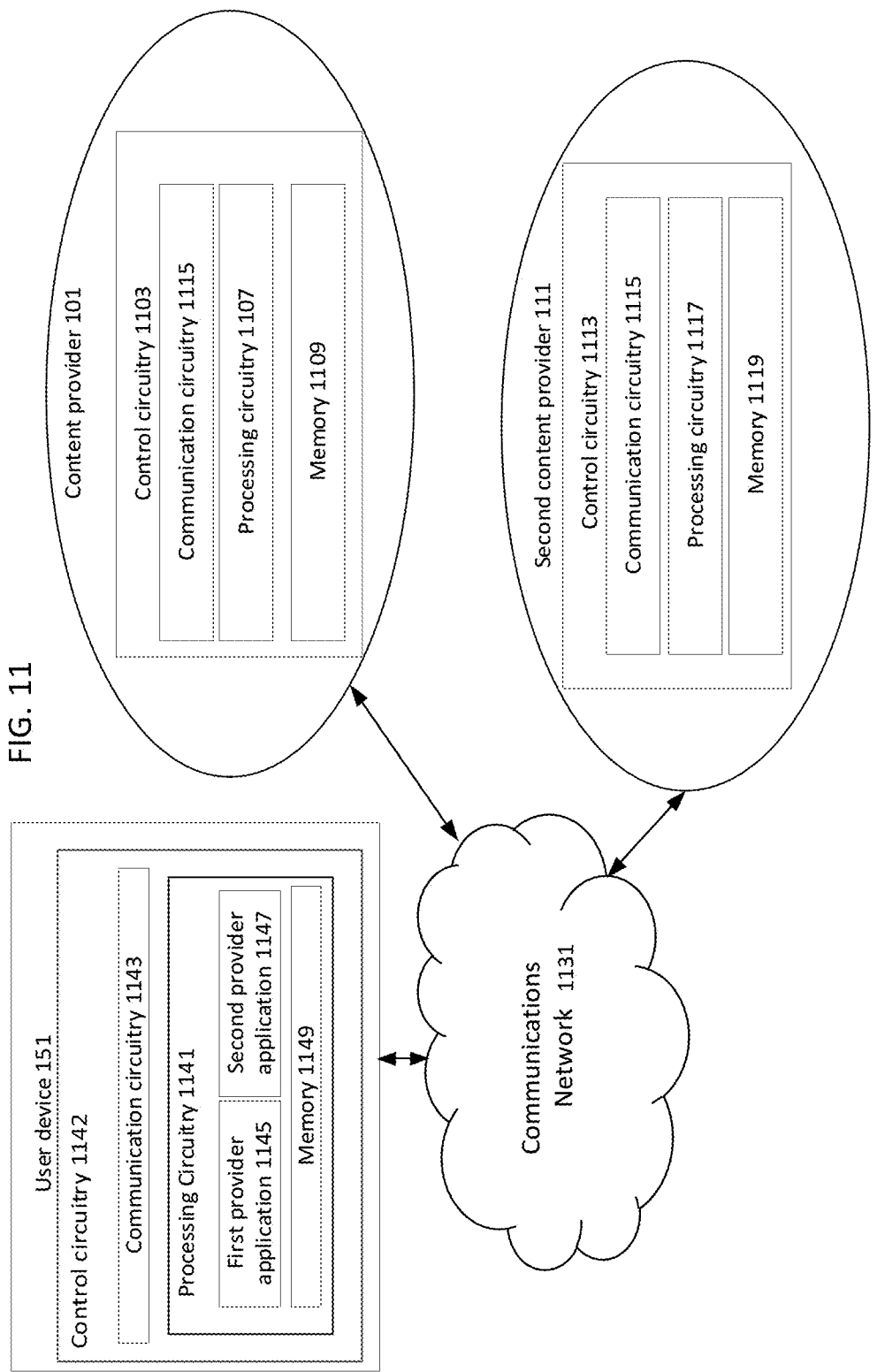
FIG. 11 illustrates an example of content provider systems communicating via a data network with a user device, according to an aspect of the disclosure.

Control circuitry 1103 of content provider 101 shown in FIG. 11 may comprise, or be provided as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1103 may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 1103 executes instructions for an emulation system application stored in memory (e.g., the storage 1109). Memory may be an electronic storage device provided as storage 1109 that is part of control circuitry 1103.

Second content server 111 may comprise control circuitry 1113, processing circuitry 1115 communication circuitry 1113 and storage 622, which may be implemented in a similar manner as control circuitry 611, I/O path 612 and storage 624, respectively of server 101. Edge computing device 111 may be configured to be in communication with one or more of user equipment devices 707, 600, 710 and video server 101 over communication network 706, and may be configured to perform processing tasks (e.g., AR generation) in connection with ongoing processing of video data. In some embodiments, a plurality of edge computing devices 111 may be strategically located at various geographic locations, and may be mobile edge computing devices configured to provide processing support for mobile devices at various geographical regions.

As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i7 processor and an Intel Core i9 processor).

In client-server based embodiments, control circuitry may include communications circuitry suitable for communicating with application server or other networks or servers. The instructions for carrying out the above mentioned functionality may be stored on the application server. Communications circuitry may include a cable modem, an integrated services digital network (ISDN) modem, a digital subscriber line (DSL) modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage that is part of control circuitry. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage may be used to store various types of content described herein as well as media guidance information, described above, and guidance application data, described above. Nonvolatile memory may also be used (e.g., to launch a boot-up routine and other instructions). Cloud-based storage may be used to supplement storage or instead of storage.

Control circuitry may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry may also include scaler circuitry for upconverting and downconverting content into the preferred output format of the user equipment. The tuning and encoding circuitry may be used by the user equipment device to receive and to display, to play, or to record content. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.).

Second content provider 111 may also include a control circuitry 1113 that includes communication circuitry 1115, processing circuitry 1117, and memory 1119 to handle functions analogous to those of control circuitry 1115 of content provider 101. Second content provider 111 may have processing circuitry 1117 provide additional types of services, including managing data requests received from content provider 101 and for providing cryptographic credentials for accessing content items available from second contact provider 111, as discussed above.

Also shown in FIG. 11 is user device 151, which includes control circuitry 1142, which may include communication circuitry 1143 for communicating via Internet Protocol or by other means with content providers and other nodes via communications network 1131; and processing circuitry 1141, which may execute first provider application 1145 that is compatible with media content items available from content provider 101 and may be downloaded from content provider 101, and second provider application 1147, which may be compatible with content items available from second content provider 111 and may be download from second content provider 111. Memory 1149 may store user interactions, including user searches, user preference data, including user likes and ratings, user names icons associated with a subscription to content providers, and content items that were consumed by user and other user profile information associated with a content provider, user subscriber/membership information regarding content providers, including current and past memberships, user credentials for accessing content providers, including cryptographic credentials for accessing content providers for which the user is not a subscriber, and may store content items or portions thereof necessary for viewing the content items. Also, one or more features described with regard to processing circuitry 1141 may be implemented as software modules stored in memory 1149.

Figure 12:
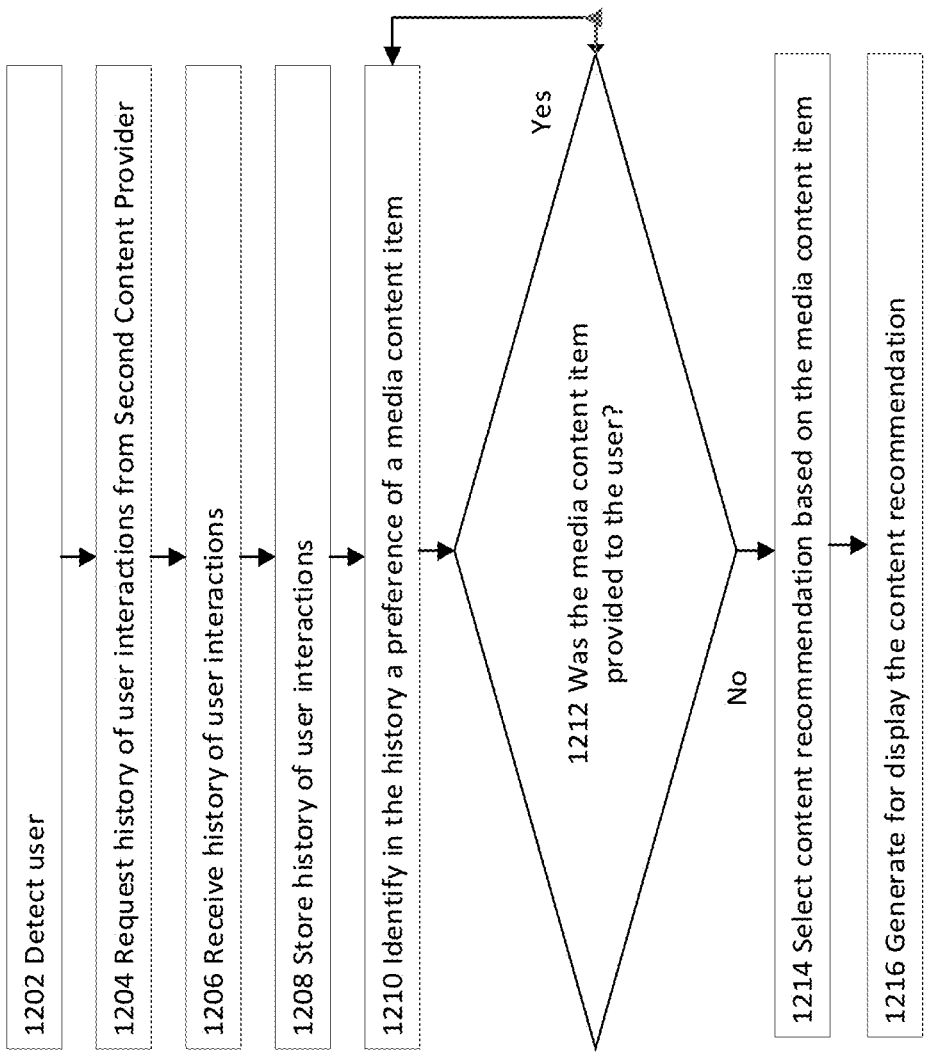
FIG. 12 is a flowchart showing an example of a content recommendation process, according to an embodiment of the disclosure.

FIG. 12 is flowchart 1200 showing a process entailed in providing content recommendations to the user device 151, according to an embodiment of the present disclosure illustrated in FIG. 1. The process may be embodied in, or performed by, the control circuitry 1103 of content provider 101.

At 1202 of FIG. 12, a new user is detected, for example, by content provider 101. However, it will be understood that content provider 101 may provide content recommendations even for established users who have not used, or interacted with, a sufficient amount for content provider 101 to be able to deliver content recommendations, or who have not interacted with content provider 101 in a while, so that content provider 101 is unable to provide timely content recommendations. Also, content provider 101 may wish to retrieve a history of user interactions for one or more users associated with a subscription who have been newly added to a subscription, or have interacted only infrequently or in the remote past with content provider 101.

At 1204, content provider 101 may request a history of user interactions from one or more partner content providers. The partner content provider(s) may be provider(s) of content of the same type of media as content provider 101, or may provide different types of content. For example, content provider 101 may be primarily streaming content provider that primarily provides movies or videos, while partner provider content provider may be a provider primarily of broadcast content according to a broadcast schedule, for example, a cable TV content provider, or vice versa.

At 1206, content provider 101 receives a history of user interactions from the second content provider 111. Content provider 101 may then store the history of user interactions at 1208. It will be understood that the storage may be local and/or may be done on a system outside of content provider 101, and/or access to the history of user interactions may be provided to a storage system of second content provider 111, and/or access may be provided to a common database shared by content providers.

At 1210, content provider 101 identifies user preferences in the history of user interactions received. The user preferences may identify specific media content items associated with a user of user equipment 151, or may identify genres or types of content items. A content item of the genre or type identified may then be recommended. Genres, favorite or usually consumed sports teams, favorite or usually consumed channels or other media sources, directors, actors, or other artists associated with favorite or usually consumed content items, or the like. By favorite, it is meant that the user has rated such things highly or has otherwise indicated strong interest.

At 1212, content provider 101 determines whether the content items indicated in the history of user interactions have been previously consumed by or provided to the user. This information may be obtained from the history of user interactions or may be obtained from user device 151. Alternatively, such user history information may be obtained from device service provider 141.

If it is determined at 1212 that the content item has been provided previously to the user device by second content provider 111, or that the user has otherwise previously consumed the content item ("yes" at 1212), then processing returns to 12/10 to identify a further media content item in the history of user interactions for the user. On the other hand, if it is determined that the media content item has not been provided previously to this user by content provider 111, or that the media content item has not been previously consumed by the user ("no" at 1212), then at 1214 a content recommendation is selected for the user based on the media content item so identified. The content item recommendation may include the media content so identified but may also include additional content items similar in some way, as described above, to the identified content item.

At 1216, the content item recommendations are generated for display to user device 151.

Figure 13:
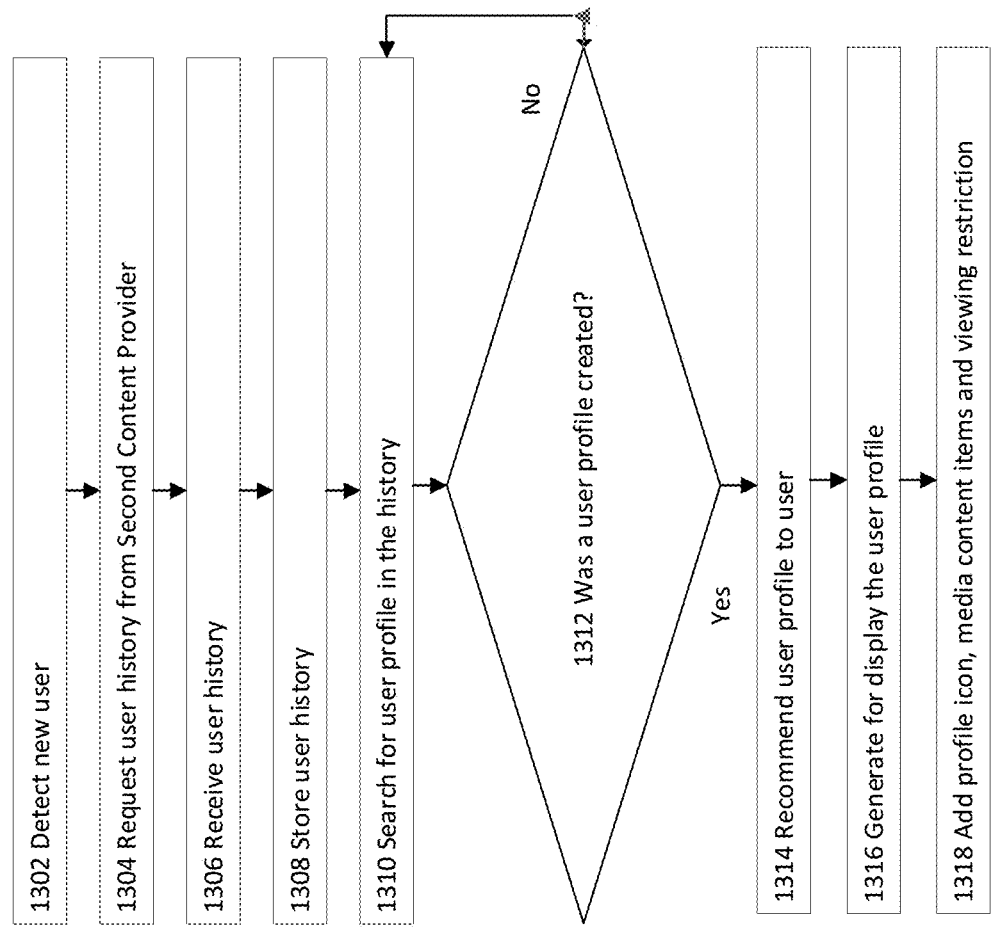
FIG. 13 is a flowchart showing an example of a user profile recommendation and generation process, according to another embodiment of the disclosure.

FIG. 13 shows a process flow 1300 for recommending user profiles for users associated with a subscription, according to the embodiment illustrated in FIG. 2. The process may be embodied in, or performed by, the control circuitry 1103 of content provider 101.

At 1302, a new user is detected. However, as described herein, including at 1202 of FIG. 12, such a process may also be invoked at other occasions when it is deemed desirable to recommend user profiles.

At 1304, a user history, which includes user profile information, may be requested from partner providers, including second content provider 111, for example, as described in connection with 1204 or in connection with FIG. 1 or 2.

At 1306, the user history is received. At 1308. this history may be stored locally or otherwise by content provider 111.

At 1310, the user profile in the history may be searched for to determine information for users associated with the present subscription.

At 1312, it is determined whether a user profile has been created for one or more users associated with the subscription. If it is determined that no previous profile was created then processing returns to 1302. On the other hand, if it is determined that a user profile has been created for one or more users associated with the subscription, then a 1314 one or more user profiles is recommended to the user via user device 151.

At 1316, one or more user profiles is generated, for example, as illustrated and described in connection with FIG. 2.

At 1318, additional profile information, including icons, media content items, viewing restrictions, preferred languages, demographic information and the like associated with each user may also be added automatically to each user profile and caused to be displayed. In addition, such profile information may also be requested from the user and added to the profile for each user.

FIG. 14 shows flowchart 1400 of a process for providing content items from partner content providers, as illustrated in the embodiment of FIGS. 3 and 4. The process may be embodied in, or performed by, the control circuitry 1103 of content provider 101.

At 1402, it is determined that a media content item is to be recommended to a user. For example, the user may search for the content item or it may be determined based on a history of user interactions that the user has indicated interested in the content item, or for a genre or type of the content item.

At 1404, it is judged whether the media content item is available at the first content provider 101. For example it is determined whether the broadcast schedule of the content provider 101 or the content library of content provider 101 includes such the content item. In addition, it may be determined whether the user is entitled to the content item under the current subscription plan of content provider 101.

If it is determined that the content item is available at first content provider 101 then a 1406 a display of recommendation for the content item, such as a trailer teaser or other type of ad, or a text notification may be transmitted to the user device 151.

At 1408 if user request to play the content item is received, then at 1410 the content item may be generated for play to the user.

On the other hand, if it is determined at 1404 that the media content item is unavailable at the first content provider 101, then at 1412 first content provider 101 may query a database cataloging availability of media content items.

At 1414, the partner content provider that has the content item available is identified and the content item is requested from the partner content provider. A media guide may be consulted for availability of the content item.

At 1416, cryptographic credentials for the content item are received. For example, the cryptographic credentials may include a one time or temporary password for the user for accessing the content item.

At 1418, a recommendation or suggestion for playing the content item may be generated for user device 151.

At 1420, a request to display or to play or to download the content item may be received from user device 151.

At 1422, play of the content item may be enabled on the application associated with the first content provider on the user device 151. For example, a Jetflix application on the user device 151 may have been downloaded from Jetflix server shown in FIGS. 3 and 4.

At 1424, additional data, such as restrictions for play of the media content item may be downloaded or imposed for playing the content item. For example, the restrictions may limit the period during which the content item may be played by user device, for example, to 24 hours or a week, or may limit the number of times the content item is played, or may limit play of the content item until the content item becomes available directly from first content provider 101. By way of illustration, if the content provider 101 will broadcast the content item at a certain date, then the content item may be made available from the second content provider 111 until that date. Or, the broadcast content of the second content provider may be recorded, and the user may be given guess access to the recording at a time other than at content broadcast time to play the content. The recording may be made at user equipment, or may be made at the broadcaster/first or second content provider. When the broadcast or when the play of the recording takes place, or before or after such times, the user may be presented content recommendations available with the second content provider, or with other upsell opportunities as part of a promotional deal between the two content providers. In the alternative, or in addition, the play of the content item of the second content provider may be contingent on providing to the user content recommendations, advertisements, or other upsell opportunities of the second content provider.

FIG. 15 shows flowchart 1500 of a process for providing content items from the second content provider 111, as illustrated in the embodiment of FIGS. 3 and 5. The process may be embodied in, or performed by, the control circuitry 1103 of content provider 101.

Steps 1502, 1504, 1506, 1508, 1510, 1512, 1514, 1516, 1518, 1520, are analogous, respectively to steps 1402, 1404, 1406, 1408, 1410, 1412, 1414, 1416, 1418, 1420 of FIG. 14.

FIG. 15 further shows that at 1522, play of the media content item may be enabled on the application of the second provider in the user device. For example, content provider 101 may transmit a deep link to the page of the content provider 111 where the content item is available. The content provider 101 may have received the deep link as part of the cryptographic credentials for the content item received from content provider 111. Or the cryptographic credentials may enable play of the media content item according to a broadcast schedule of second content provider 111. Or, the cryptographic credentials may include credentials for downloading the application associated with the second content provider 111, which enables the user device to download or to stream content items available from the second content provider 111. An example of such an application associated with the second content provider is Julu app 157 shown in FIG. 5.

At 1526 of FIG. 15, restrictions for playing the media content item may be imposed, for example, such restrictions may be set in the application associated with the second content provider 111 on user device 151 or they may be set on one or more servers of second content provider 111 providing the content item.

The process concludes at step 1526 and may repeat continuously starting from step 1502. It should be understood that the above steps of the flow diagrams of FIGS. 12-15 may be executed or performed in any order or sequence not limited to the order and sequence shown and described in the figures. Also, some of the above steps of the flow diagrams of FIGS. 12-15 may be executed or performed substantially simultaneously, where appropriate.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be effected to the particular embodiments by those of skill in the art without departing from the scope of the present application, which is defined solely by the claims appended hereto.

What is claimed is:

1. A method comprising:
    identifying, by a first content provider, a content item to be recommended for play at a first content provider application running on one or more devices associated with a subscribing user of the first content provider;
    determining, by the first content provider, that the content item is unavailable for play in the first content provider application directly from a first server system of the first content provider;
    in response to the determining, identifying, by the first content provider, an availability of the content item from a second server system of a second content provider for the subscribing user of the first content provider;
    receiving, by the first server system of the first content provider, from the second server system of the second content provider cryptographic credentials to enable accessing of the content item from the second server system of the second content provider; and
    enabling play of the content item at the first content provider application running on one or more of the devices associated with the subscribing user, wherein the content item is accessed via the first content item provider application from the second server system of the second content provider using the cryptographic credentials.

2. The method of claim 1, wherein the cryptographic credentials comprise a time limit for the play of the content item to the at least one or more devices associated with the subscribing user.

3. The method of claim 1, wherein the cryptographic credentials comprise a user limit restricting the play of the content item to the one or more devices associated with the subscribing user.

4. The method of claim 1, wherein the cryptographic credentials comprise a user limit restricting the play of the content item to user devices associated with a class of subscribing users, wherein the class is defined by user demographic information.

5. The method of claim 1, wherein the cryptographic credentials comprise a limit restricting the play of the content item to the one or more devices associated with the subscribing user when a recommendation for a second content item is played to the one or more devices associated with the subscribing user.

6. The method of claim 1, wherein the cryptographic credentials comprise a limit restricting a number of plays of the content item to the one or more devices associated with the subscribing user to a maximum number of times.

7. The method of claim 1, wherein the identifying of the availability of the content item comprises querying for the content item to a database cataloguing media content items available from a plurality of content providers, including the second content provider.

8. The method of claim 1, further comprising, obtaining digital rights, by the first content provider, for play of the first content item.

9. The method of claim 1, wherein the identifying of the content item is based on a user search for the content item on one or more of the devices associated with the subscribing user.

10. A method comprising:
identifying, by a first content provider, a content item to be recommended for play at one or more devices associated with a subscribing user of the first content provider;
determining, by the first content provider, that the content item is unavailable for play for the subscribing user from a first server system of the first content provider;
in response to the determining, identifying, by the first content provider, an availability of the content item from a server system of a second content provider;
receiving, by the first server system of the first content provider, from the server system of the second content provider, a link to enable accessing of the content item, via an application of the second content provider, from the second server system of the second content provider; and
enabling play of the content item by transmitting the link to one or more of the devices associated with the subscribing user.

11. The method of claim 10, further comprising receiving, by the first content provider, from the server system of the second content provider, cryptographic credentials for accessing the content item from the server system of the second provider.

12. The method of claim 11, wherein the cryptographic credentials provide the access to the content item via a temporary user profile for the second content provider.

13. The method of claim 11, wherein the cryptographic credentials comprise a time limit for the play of the content item.

14. The method of claim 11, wherein the cryptographic credentials comprise a user limit restricting the play of the content item to the one or more devices associated with the subscribing user.

15. The method of claim 11, wherein the cryptographic credentials comprise a user limit restricting the play of the content item to user devices associated with a class of subscribing users, wherein the class is defined by user demographic information.

16. The method of claim 11, wherein the cryptographic credentials comprise a limit restricting the play of the content item to the one or more devices associated with the subscribing user when a recommendation for a second content item is played to the one or more devices associated with the subscribing user.

17. The method of claim 11, wherein the cryptographic credentials comprise a limit restricting a number of plays of the content item to the one or more devices associated with the subscribing user to a maximum number of times.

18. The method of claim 10, wherein identifying the availability of the content item comprises querying for the content item to a database cataloguing media content items, including the content item, available from a plurality of content providers, including the second content provider.

19. The method of claim 10, further comprising, obtaining digital rights, by the first content provider, for the play of the content item.

20. The method of claim 10, wherein the identifying of the content item is based on a user search for the content item on one or more of the devices associated with the subscribing user.

* * * * *